(12) United States Patent
Masuda et al.

(10) Patent No.: US 12,412,540 B2
(45) Date of Patent: Sep. 9, 2025

(54) LIQUID CRYSTAL PANEL AND DISPLAY DEVICE

(71) Applicant: Sharp Display Technology Corporation, Kameyama (JP)

(72) Inventors: Junichi Masuda, Kameyama (JP); Koji Murata, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/397,948

(22) Filed: Dec. 27, 2023

(65) Prior Publication Data

US 2024/0257775 A1  Aug. 1, 2024

(30) Foreign Application Priority Data

Jan. 25, 2023  (JP) .................. 2023-009444

(51) Int. Cl.
| | |
|---|---|
| G09G 3/36 | (2006.01) |
| G02F 1/133 | (2006.01) |
| G02F 1/1335 | (2006.01) |
| G02F 1/13363 | (2006.01) |
| G02F 1/139 | (2006.01) |
| G06F 3/01 | (2006.01) |
| G09G 3/34 | (2006.01) |

(52) U.S. Cl.
CPC .......... *G09G 3/36* (2013.01); *G02F 1/13306* (2013.01); *G02F 1/133531* (2021.01); *G02F 1/133634* (2013.01); *G02F 1/1393* (2013.01); *G06F 3/013* (2013.01); *G09G 3/3406* (2013.01); *G02F 2413/01* (2013.01); *G02F 2413/14* (2013.01); *G09G 2320/028* (2013.01); *G09G 2354/00* (2013.01)

(58) Field of Classification Search
CPC .. G09G 3/36; G09G 3/3406; G09G 2320/028; G09G 2354/00; G09G 3/34; G09G 3/20; G02F 1/133531; G02F 1/13306; G02F 1/133634; G02F 1/1393; G02F 2413/01; G02F 2413/14; G02F 1/13; G02F 1/133; G06F 3/013; G06K 9/00
See application file for complete search history.

(56) References Cited

U.S. PATENT DOCUMENTS

| | | | | |
|---|---|---|---|---|
| 7,348,953 B1 * | 3/2008 | Satake | ................. | G09G 3/3614 345/97 |
| 2009/0322668 A1 * | 12/2009 | Sugiyama | ............. | G02F 1/1396 349/72 |
| 2014/0292732 A1 * | 10/2014 | Niioka | ................. | G09G 3/3648 345/204 |

(Continued)

FOREIGN PATENT DOCUMENTS

JP  2018-120210 A  8/2018

*Primary Examiner* — Michael A Faragalla
(74) *Attorney, Agent, or Firm* — ScienBiziP, P.C.

(57) ABSTRACT

A liquid crystal panel includes a first substrate, a second substrate disposed to face the first substrate, a liquid crystal layer that is located between the first substrate and the second substrate and contains liquid crystal molecules, a pair of electrodes that apply a voltage to the liquid crystal layer, and a voltage control unit that performs control to alternately apply a first voltage having a first absolute value and a second voltage having a second absolute value different from the first absolute value between the pair of electrodes.

16 Claims, 18 Drawing Sheets

(56) References Cited

U.S. PATENT DOCUMENTS

| | | | | |
|---|---|---|---|---|
| 2016/0133200 A1* | 5/2016 | Kim | ............ | G09G 3/3688 |
| | | | | 345/207 |
| 2018/0210243 A1* | 7/2018 | Fang | ............ | G02F 1/137 |
| 2020/0326573 A1* | 10/2020 | Shin | ............ | G02F 1/1337 |
| 2020/0341316 A1* | 10/2020 | Kim | ............ | C08L 67/02 |
| 2021/0382369 A1* | 12/2021 | Zheng | ............ | G02F 1/1685 |
| 2022/0282159 A1* | 9/2022 | Zhang | ............ | C09K 19/3003 |
| 2022/0382109 A1* | 12/2022 | Haruyama | ............ | G02F 1/13363 |

\* cited by examiner

LIQUID CRYSTAL PANEL AND DISPLAY DEVICE

BACKGROUND

1. Field

The following disclosure relates to a liquid crystal panel and a display device.

2. Description of the Related Art

A liquid crystal panel is an optical element that controls the amount of light transmitted by applying a voltage to a liquid crystal composition sealed between a pair of substrates and changing the alignment state of liquid crystal molecules in the liquid crystal composition according to the applied voltage. Such a liquid crystal panel is used in a wide range of fields by utilizing characteristics such as thinness, light weight, and low power consumption.

In the related art, in a display device, it is studied to improve a viewing angle characteristic so that the same image can be viewed regardless of whether the display device is viewed from a narrow viewing angle range or a wide viewing angle range. On the other hand, from the viewpoint of maintaining privacy, a display method has been studied in which an image can be viewed from a range of a narrow viewing angle, but the image is difficult to be viewed from a range of a wide viewing angle. As described above, there is a need for a display device capable of switching between a public mode (wide viewing angle mode) in which the same image can be observed both in a range of a narrow viewing angle and a range of a wide viewing angle and a private mode (narrow viewing angle mode) in which an image can be observed in a narrow of a narrow viewing angle range, but it is difficult to observe the image in a range of a wide viewing angle.

It is possible to realize a display device capable of switching between a public mode and a private mode by using, for example, a liquid crystal panel. For example, Japanese Unexamined Patent Application Publication No. 2018-120210 discloses a display device capable of switching between viewing angles, the device including a display panel, an electrically controlled viewing angle switch, an electrically controlled light scattering switch, and a backlight module, in which the electrically controlled viewing angle switch faces the display panel and includes two first light-transmitting substrates, two first light-transmitting conductive layers located between the two first light-transmitting substrates, a liquid crystal layer located between the two first light-transmitting conductive layers, and a first polarizing plate located on a side distant from the display panel of the electrically controlled viewing angle switch, the liquid crystal layer includes a plurality of liquid crystal molecules, the optical axis of the plurality of liquid crystal molecules is parallel or perpendicular to the transmission axis of the first polarizing plate, and the electrically controlled light scattering switch is located between the display panel and the backlight module and includes two second light-transmitting substrates, two second light-transmitting conductive layers located between the two second light-transmitting substrates, and an electrically controlled polymeric material layer located between the two second light-transmitting conductive layers.

When a display device capable of switching between a public mode and a private mode (hereinafter, also referred to as a viewing angle control switching type display device) is observed from the front of a screen, it is possible to visually recognize an image at all times. On the other hand, when a viewing angle control switching type display device is observed from an oblique direction deviated in the horizontal direction from the front of the screen, it is possible to switch between a mode in which an image can be visually recognized and a mode in which an image is not visually recognized. A viewing angle control switching type display device in which a viewing angle can be switched in this manner is being introduced, for example, in an in-vehicle display for a passenger seat (co-driver display).

Examples of the method for switching a viewing angle include a method of controlling the amount of light of a backlight by using a louver film that controls the viewing angle, and a method of adding a liquid crystal panel capable of switching between light transmission and light shielding, and the like. According to the former method of using the louver film, the light shielding property in an oblique direction can be enhanced, but it is difficult to obtain high visibility in the oblique direction. According to the latter method of adding the liquid crystal panel, high light shielding property can be realized at a position deviated at a specific angle in the horizontal direction from the front of the screen. However, there is an issue that when an observer shifts from a position with the high light shielding property in the vertical direction (for example, at a position looking down on a display device), the light shielding property is deteriorated.

FIGS. 29 and 30 are schematic perspective views illustrating an example of a viewing angle control switching type display device capable of switching between a public mode and a private mode. FIG. 31 is a graph illustrating a light shielding performance of the viewing angle control switching type display device illustrated in FIGS. 29 and 30.

Examples of a display device 1R of a viewing angle control switching type realized by the method of adding a liquid crystal panel include, for example, as illustrated in FIG. 29, a display device including a liquid crystal panel 10R, a liquid crystal display panel 20 as a display panel, and a backlight 30 in order from the observation side to the back side, and as illustrated in FIG. 30, a display device including the liquid crystal display panel 20 as a display panel, the liquid crystal panel 10R, and the backlight 30 in order from the observation side to the back side. The liquid crystal panel 10R is also referred to as a light shielding panel.

As illustrated in FIG. 31, when the viewing angle control switching type display device 1R is viewed from the front of the screen, the transmittance in the horizontal direction (in particular, the vicinity of the polar angle of −20° to)−40° is suppressed and high light shielding property is realized. However, when looking down on the viewing angle control switching type display device 1R from the angle higher than 10° in the vertical direction from the front of the screen, the transmittance increases in the horizontal direction (in particular, from the vicinity of the polar angle of −20° to −) 40° and the light shielding property decreases. Further, when looking down from an angle higher than 20° in the vertical direction from the front of the screen, the transmittance increases in the horizontal direction (in particular, from the vicinity of the polar angle of −20° to)−40° and the light shielding property decreases more than when looking down the panel from an angle higher than 10°.

The reason for this is considered as follows. In the viewing angle control switching type display device 1R, a light shielding angle is determined by a design of a module and an applied voltage, but since the angle at which the light shielding performance is maximized is limited to a specific angle, the light shielding performance deteriorates as the angle deviates from that position.

In the present specification, when the display device is viewed from the front of the screen, it means that the line of sight of the observer passes through the center of the screen and is parallel to the normal line of the screen. When the display device is viewed from an angle higher than 10° in the vertical direction from the front of the screen, it means that the observer is visually recognizing the screen from above the front of the screen, and the angle between the line of sight and the normal line to the screen is 10°. When the display device is viewed from an angle higher than 20° in the vertical direction from the front of the screen, it means that the observer is visually recognizing the screen from above the front of the screen, and the angle between the line of sight and the normal line to the screen is 20°.

In the present specification, the horizontal direction refers to a direction parallel to an azimuth angle of 0° to 180°, and the vertical direction (also referred to as vertical direction) refers to a direction parallel to an azimuth angle of 90° to 270°. In FIG. 31, the position in the horizontal direction is illustrated by a polar angle.

In the present specification, the polar angle refers to the angle formed by a target direction (for example, measurement direction) and a surface (hereinafter, also simply referred to as "the surface along the vertical direction of the screen") that passes through the center of the screen of a liquid crystal panel (or display device), is perpendicular to the screen, and runs along the screen in the vertical direction (direction parallel to azimuth angle 90° to 270°). Further, the polar angle is expressed as a positive value when the target direction is located to the right of the plane along the screen in the vertical direction (that is, regions where the azimuth angle is equal to or more than 0° and less than 90°, and regions where the azimuth angle is higher than 270° and less than 360°), and is expressed as a negative value when the target direction is located to the left of the plane along the screen in the vertical direction (that is, in regions where the azimuth angle is higher than 90° and is less than 270°).

In Japanese Unexamined Patent Application Publication No. 2018-120210, a display device capable of switching between a private mode and a public mode is realized by combining a liquid crystal panel that extends light distribution and a liquid crystal panel (light shielding panel) that controls a viewing angle. However, in the display device of Japanese Unexamined Patent Application Publication No. 2018-120210, the light shielding performance decreases as the distance from a specific light shielding angle increases, and sufficient light shielding performance may not be obtained depending on the position of an observer visually recognizing a display. For example, in Japanese Unexamined Patent Application Publication No. 2018-120210, when the observer visually recognizes the display from a position deviated from the front of the screen in the vertical direction, that is, from the upper side of the screen or the lower side of the screen, the horizontal light shielding property may deteriorate.

The present disclosure has been made in view of the above-mentioned situation, and aims to provide a liquid crystal panel that can suppress deterioration of light shielding property in a horizontal direction when an observer visually recognize the panel from the upper side of a screen or the lower side of the screen, and a display device including the liquid crystal panel.

SUMMARY (1) According to an aspect of the present disclosure, a liquid crystal panel includes a first substrate, a second substrate disposed to face the first substrate, a liquid crystal layer that is located between the first substrate and the second substrate and contains liquid crystal molecules, a pair of electrodes that apply a voltage to the liquid crystal layer, and a voltage control unit that performs control to alternately apply a first voltage having a first absolute value and a second voltage having a second absolute value different from the first absolute value between the pair of electrodes.

(2) According to another aspect of the present disclosure, a display device includes a liquid crystal panel in the above (1), and a display panel.

DESCRIPTION OF THE EMBODIMENTS

Definition of Terms

Figure 1:
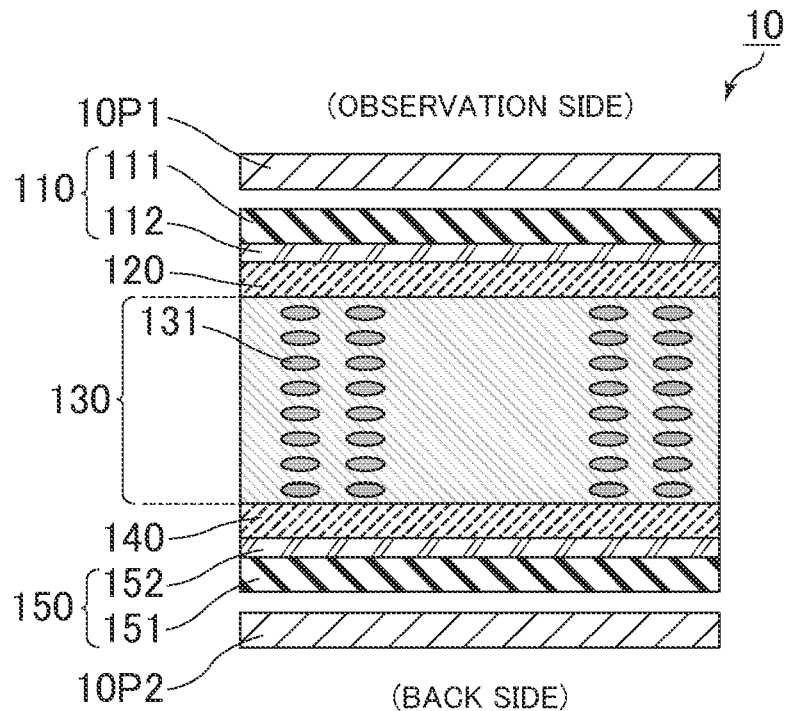
FIG. 1 is a schematic cross-sectional view of a liquid crystal panel according to Embodiment 1 in a state with no voltage applied.

In the present specification, an observation side means a side closer to a screen (display surface) of a liquid crystal panel, and a back side means a side farther from the screen (display surface) of the liquid crystal panel.

In the present specification, an azimuth means a direction when a target direction is projected onto the screen of a liquid crystal panel (or display device), and is expressed by an angle (azimuth angle) formed between the azimuth and a reference azimuth. Here, a reference azimuth (0°) is set in a horizontal right direction of the screen of a liquid crystal panel (or display device). An azimuth angle is defined as a positive angle in counterclockwise rotation, and a negative angle in clockwise rotation. Each of counterclockwise rotation and clockwise rotation represents a rotation direction when the screen of a liquid crystal panel (or display device) is viewed from the observation side (from the front). Further, an angle represents a value measured in a state where a liquid crystal panel (or display device) is viewed in a plan view, and two straight lines (including axes, directions, and edges) being orthogonal to each other means that the two straight lines are orthogonal to each other when the liquid crystal panel (or display device) is viewed in a plan view.

In the present specification, the front of a screen refers to a direction that passes through the center of the screen and is parallel to a normal line of the screen. The upper side of the screen refers to a region having an azimuth angle of more than 0° and less than 180°. The lower side of the screen refers to a region whose azimuth angle is more than 180° and less than 360°. The right side of the screen refers to a region having an azimuth angle of 0° or more and less than 90°, and a region having an azimuth angle of more than 270° and less than 360°. The left side of the screen refers to a region having an azimuth angle of more than 90° and less than 270°.

In the present specification, an axial azimuth means an absorption axis (reflection axis) of a polarizer or an azimuth of an optical axis (slow axis) of a birefringent layer unless otherwise specified.

In the present specification, two axes being orthogonal to each other means that the angle formed by the two axes is 90°±3°, preferably 90°±1°, more preferably 90°±0.5°, particularly preferably 90° (completely orthogonal). The two axes being parallel to each other means the angle formed by the two axes is 0°±3°, preferably 0°+1°, more preferably 0°±0.5°, and particularly preferably 0° (completely parallel).

In the present specification, a retardation Rp in an in-plane direction is defined as Rp=(ns−nf) d. A retardation Rth in a thickness direction is defined as Rth=(nz−(nx+ny)/2) d. ns refers to the larger one of nx and ny, and nf refers to the smaller one. In addition, nx and ny indicate main refractive indexes of the in-plane direction of a birefringent layer (including a phase difference plate and a liquid crystal panel), nz indicates a main refractive index in the out-of-plane direction, that is, in the direction perpendicular to the plane of the birefringent layer, and d indicates the thickness of the birefringent layer.

In the present specification, the measurement wavelength of optical parameters such as main refractive indexes and a phase difference is 550 nm unless otherwise specified.

In the present specification, the birefringent layer is a layer having an optical anisotropy, and is a concept including a phase difference plate and a liquid crystal panel. The birefringent layer, for example, has a value of 10 nm or more in any one of the absolute values of the retardation in the in-plane direction and the retardation in the thickness direction, and preferably has a value of 20 nm or more.

Hereinafter, embodiments of the present disclosure will be described. The present disclosure is not limited to the contents described in the following embodiments and modification examples, and design changes can be made as appropriate within the scope of satisfying a configuration of the present disclosure. In the following description, the same reference numerals will be used for the same parts or parts having similar functions in common in different drawings, and the repeated descriptions thereof will be omitted as appropriate. Each aspect of the present disclosure may be appropriately combined without departing from the gist of the present disclosure.

Embodiment 1

Figure 2:
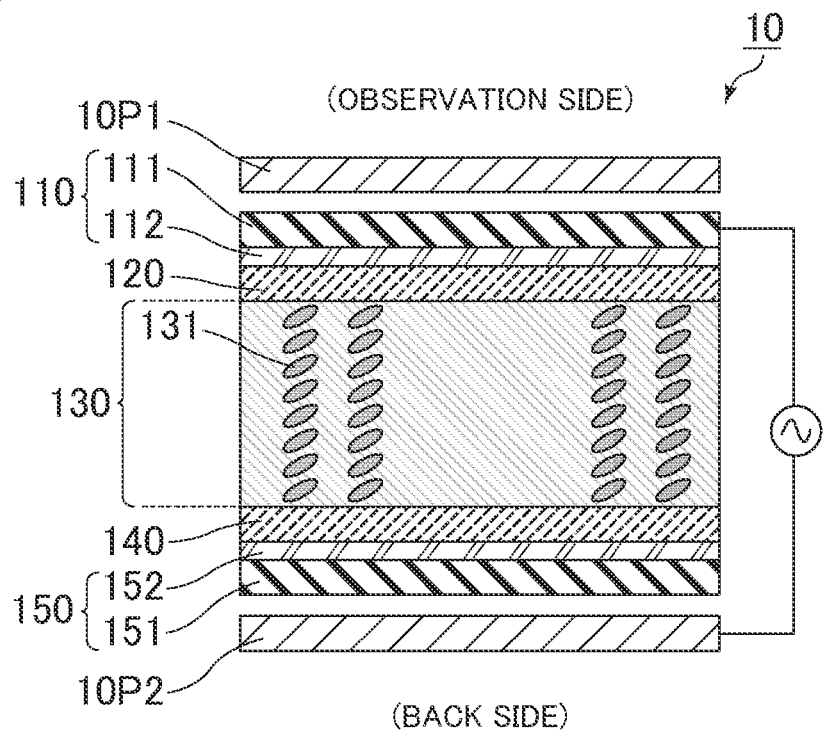
FIG. 2 is a schematic cross-sectional view of the liquid crystal panel according to Embodiment 1 in a state with a voltage applied.
Figure 3:
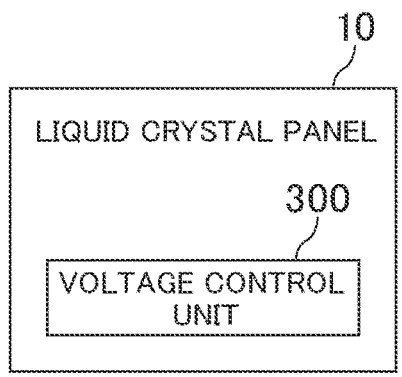
FIG. 3 is a block view schematically illustrating the liquid crystal panel according to Embodiment 1.

FIG. 1 is a schematic cross-sectional view of a liquid crystal panel according to Embodiment 1 in a state with no voltage applied. FIG. 2 is a schematic cross-sectional view of the liquid crystal panel according to Embodiment 1 in a state with a voltage applied. FIG. 3 is a block view schematically illustrating the liquid crystal panel according to Embodiment 1. As illustrated in FIGS. 1 to 3, a liquid crystal panel 10 of the present embodiment includes a first substrate 110, a second substrate 150 that is disposed to face the first substrate 110, a liquid crystal layer 130 that is located between the first substrate 110 and the second substrate 150 and contains liquid crystal molecules 131, a first electrode 112 and a second electrode 152 as the pair of electrodes that apply a voltage to the liquid crystal layer 130, and a voltage control unit 300 that performs control to alternately apply a first voltage having a first absolute value and a second voltage having a second absolute value different from the first absolute value between the pair of electrodes (the first electrode 112 and the second electrode 152). With such an aspect, the liquid crystal panel 10 can be driven by the first voltage and the second voltage which are different from each other, and when an observer visually recognizes the panel from the upper side of a screen or the lower side of the screen, it is possible to suppress the deterioration of a light shielding property in a horizontal direction. That is, even when the line of sight of a person who visually recognize the screen shifts to the upper side or the lower side from a horizontal position of the screen, it is possible to suppress the deterioration of the light shielding property in the horizontal direction. The liquid crystal panel 10 of the present embodiment is also referred to as a light shielding panel. Hereinafter, the effect will be described in detail.

Figure 4:
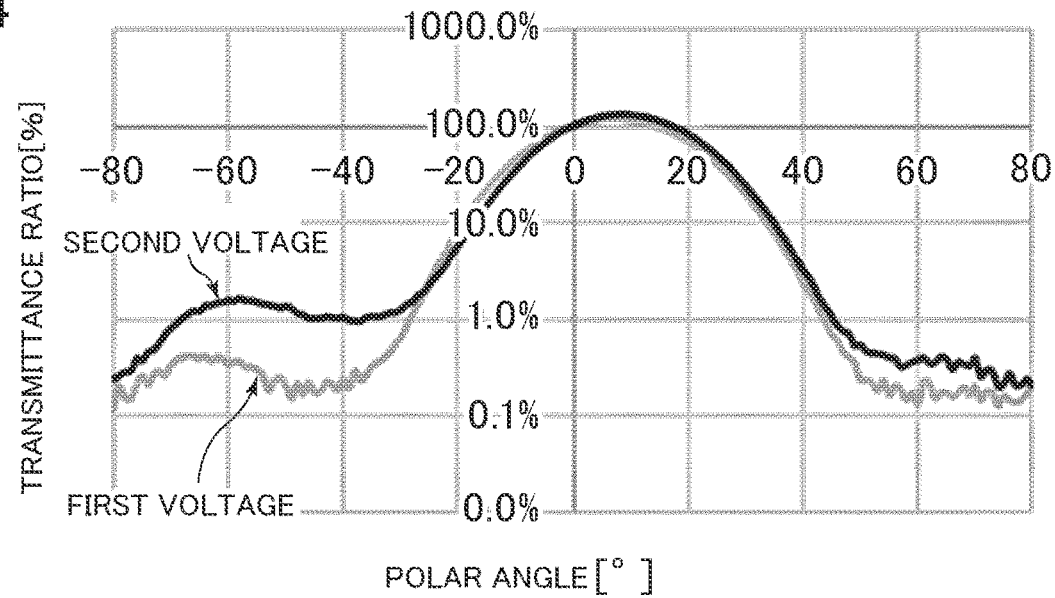
FIG. 4 is a graph illustrating a light shielding performance in a horizontal direction when a liquid crystal panel in the related art used as a light shielding panel is viewed from the front of a screen, and a light shielding performance when a first voltage is applied between a pair of electrodes, and a light shielding performance when a second voltage is applied, respectively.
Figure 5:
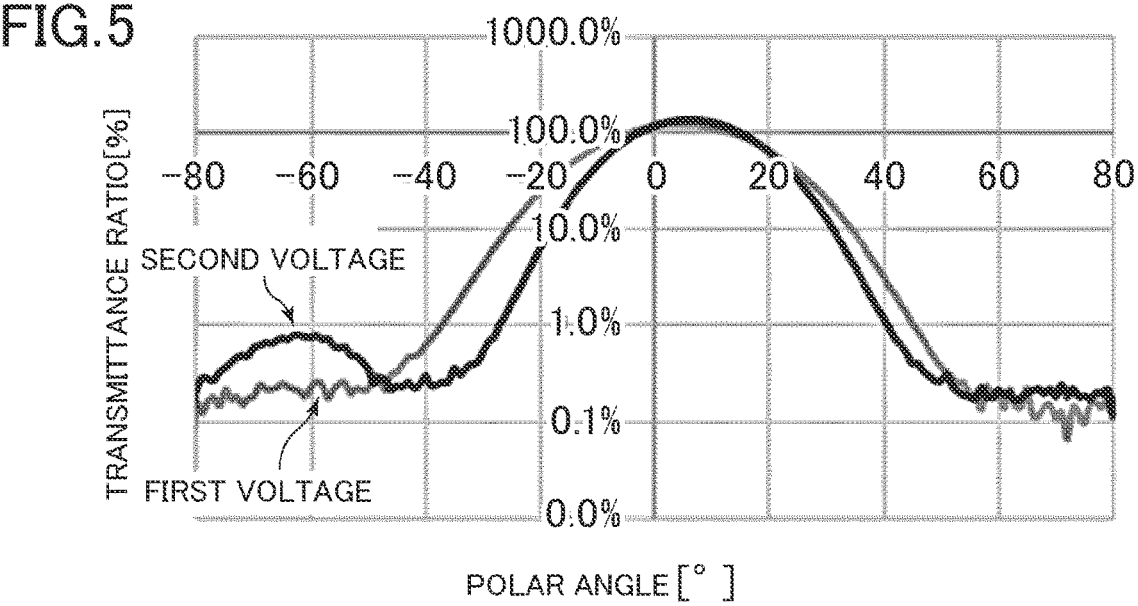
FIG. 5 is a graph illustrating a light shielding performance in the horizontal direction when looking down on the liquid crystal panel in the related art used as a light shielding panel from an angle higher than 20° in a vertical direction from the front of the screen, and is a graph illustrating a light shielding performance when the first voltage is applied between a pair of electrodes, and a light shielding performance when the second voltage is applied.
Figure 6:
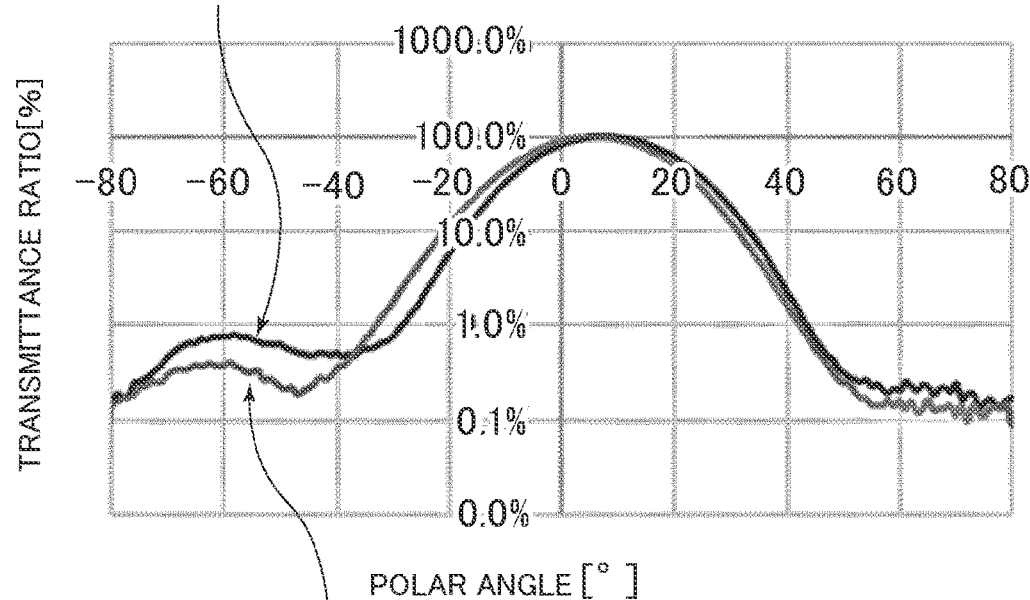
FIG. 6 is a graph illustrating a light shielding performance in a horizontal direction when the liquid crystal panel according to Embodiment 1 is viewed from the front of a screen, and a light shielding performance in the horizontal direction when looking down on the liquid crystal panel according to Embodiment 1 from an angle higher than 20° in a vertical direction from the front of the screen.

FIG. 4 is a graph illustrating a light shielding performance in a horizontal direction when a liquid crystal panel in the related art used as a light shielding panel is viewed from the front of a screen, and is a graph illustrating a light shielding performance when a first voltage is applied between a pair of electrodes, and a light shielding performance when a second voltage is applied, respectively. FIG. 5 is a graph illustrating a light shielding performance in the horizontal direction when looking down on the liquid crystal panel in the related art used as a light shielding panel from an angle higher than 20° in a vertical direction from the front of the screen, and is a graph illustrating a light shielding performance when the first voltage is applied between a pair of electrodes, and a light shielding performance when the second voltage is applied. FIG. 6 is a graph illustrating a light shielding performance in a horizontal direction when the liquid crystal panel according to Embodiment 1 is viewed from the front of a screen, and a light shielding performance in the horizontal direction when looking down on the liquid crystal panel according to Embodiment 1 from an angle higher than 20° in a vertical direction from the front of the screen.

As illustrated in FIGS. 4 and 5, in the liquid crystal panel in the related art used as a light shielding panel, it is possible to control the light shielding angle of the light shielding panel by changing the setting of voltages. Therefore, when looking down on the panel from the upper side of the screen, as illustrated in FIG. 5, for example, when applying the second voltage rather than applying the first voltage, it is possible to suppress the transmittance from the vicinity of the polar angle of −5° to −50°, and a higher light shielding performance can be obtained in the horizontal direction. However, when viewed from the front of the screen, as illustrated in FIG. 4, for example, when applying the second voltage rather than applying the first voltage, the transmittance increases from the vicinity of the polar angle of −30° to −80°, the light shielding performance in the horizontal direction deteriorates. In the present specification, the transmittance particularly refers to a transmittance front luminance ratio.

On the other hand, in the liquid crystal panel 10 of the present embodiment, the voltage control unit 300 can alternately apply a first voltage having a first absolute value and a second voltage having a second absolute value different from the first absolute value between a pair of electrodes (the first electrode 112 and the second electrode 152). As a result, as illustrated in FIG. 6, it is possible to realize a high light shielding property in the horizontal direction either when the liquid crystal panel 10 is viewed from the front of the screen or when looking down on the panel from above.

Here, the reason why the region where the polar angle is negative is focused on is that the light shielding panel is assumed to be used in an in-vehicle display, in particular, for a passenger seat in a left-hand drive vehicle. It is easy to reverse the light shielding function of the light shielding panel in the left and right, and the light shielding panel can be used for a right-hand drive vehicle. Hereinafter, details of the liquid crystal panel 10 according to the present embodiment will be described.

The voltage control unit 300 performs control to alternately apply a first voltage having a first absolute value and a second voltage having a second absolute value different from the first absolute value between a pair of electrodes (the first electrode 112 and the second electrode 152). Such control of voltages is realized by, for example, a digital control circuit designed to vary the magnitude of a voltage. The digital control circuit outputs, for example, a voltage signal drawing a rectangular wave, and is configured to switch between a positive voltage and a negative voltage.

A preferable range of the first absolute value changes depending on a thickness of the liquid crystal layer 130 (cell thickness) and an anisotropy of dielectric constant (Δε) of the liquid crystal molecules 131, but is usually set to 2.5 or more and 5 or less.

The second absolute value is preferably 1.05 times or more and 1.20 times or less the first absolute value. For example, as in a case where the first absolute value is 3 and the second absolute value is 3.2, the second absolute value is preferably 1.05 times or more and 1.10 times or less the first absolute value. Further, as in a case where the first absolute value is 3 and the second absolute value is 3.5, the second absolute value is preferably 1.10 times or more and 1.20 times or less the first absolute value. The above is an example, and the relationship between the first absolute value and the second absolute value can be freely set as long as a desired effect is obtained.

Figure 7:
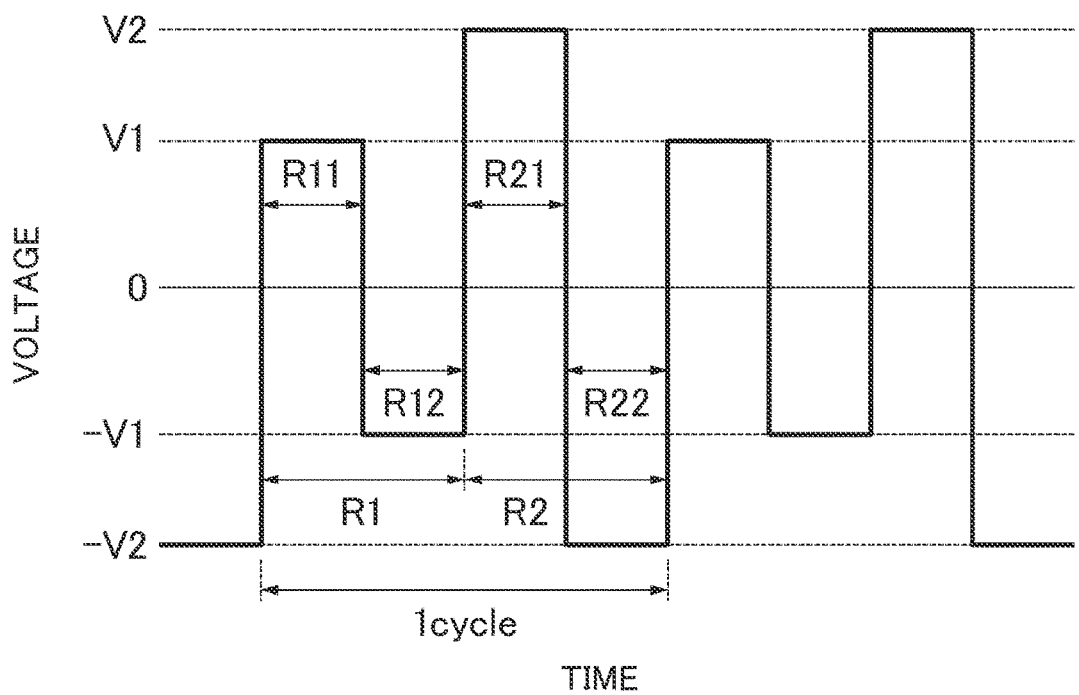
FIG. 7 is a graph illustrating an example of a waveform of a voltage applied between a pair of electrodes included in the liquid crystal panel according to Embodiment 1.

FIG. 7 is a graph illustrating an example of a waveform of a voltage applied between a pair of electrodes included in the liquid crystal panel according to Embodiment 1. In the present embodiment, as illustrated in FIG. 7, the first absolute value corresponds to V1, and the second absolute value corresponds to V2. V1 and V2 are positive values.

The voltage V1 is generally set to 2.5 V or more and 5 V or less. Here, as in a case where the voltage V1 is 3 V and the voltage V2 is 3.2 V, the voltage V2 is preferably set to a voltage higher than the voltage V1 by 5% or more and 10% or less. Further, as in a case where the voltage V1 is 3 V and the voltage V2 is 3.5 V, the voltage V2 is preferably set to a voltage higher than the voltage V1 by 10% or more and 20% or less. The above is an example, and the relationship between the voltage V1 and the voltage V2 can be freely set as long as the desired effect is obtained.

As illustrated in FIG. 7, a waveform of the voltage applied between the pair of electrodes included in the liquid crystal panel 10 of the present embodiment alternately has a region R1 corresponding to the first voltage and a region R2 corresponding to the second voltage. The region R1 corresponding to the first voltage is a region to which the first voltage is continuously applied, and the region R2 corresponding to the second voltage is a region to which the second voltage is continuously applied.

Here, the region R1 corresponding to the first voltage may include only one amplitude region corresponding to the first absolute value, or may include two or more amplitude regions. Further, the region R2 corresponding to the second voltage may include only one amplitude region corresponding to the second absolute value, or may include two or more amplitude regions. The amplitude region refers to each of a peak region and a valley region in a voltage waveform, and the sum of the number of peak regions and the number of valley regions is the number of amplitude regions.

In the present embodiment, in the waveform of the voltage applied between the pair of electrodes, the region R1 corresponding to the first voltage includes a region R11 to which the voltage V1 is applied and a region R12 to which the voltage –V1 is applied, and the region R2 corresponding to the second voltage includes a region R21 to which the voltage V2 is applied and a region R22 to which the voltage –V2 is applied.

The region R11 to which the voltage V1 is applied is a region to which the voltage V1 is continuously applied, the region R12 to which the voltage –V1 is applied is a region to which the voltage –V1 is continuously applied, the region R21 to which the voltage V2 is applied is a region to which the voltage V2 is continuously applied, and the region R22 to which the voltage –V2 is applied is a region to which the voltage –V2 is continuously applied.

As illustrated in FIG. 7, the first voltage of the present embodiment includes the voltage V1 that has the first absolute value and is a positive value, and the voltage –V1 that has the first absolute value and is a negative value, the second voltage includes the voltage V2 that has the second absolute value and is a positive value, and the voltage –V2 that has the second absolute value and is a negative value, and the voltage control unit 300 repeatedly applies the voltage V1, the voltage –V1, the voltage V2, and the voltage –V2 in this order between the pair of electrodes. With such an aspect, when the observer visually recognizes the panel from the upper side of the screen or the lower side of the screen, it is possible to more effectively suppress the deterioration of the light shielding property in the horizontal direction.

It is appropriately set a frequency of the voltage applied between the pair of electrodes (also referred to as a driving frequency of a panel). The driving frequency of the panel is, for example, 30 Hz or more and 300 Hz or less, preferably 45 Hz or more and 240 Hz or less, and more preferably 60 Hz or more and 120 Hz or less. Since the driving frequency of the panel is 300 Hz or less, it is possible to sufficiently drive the liquid crystal molecules. Since the driving frequency of the panel is 60 Hz or more, it is possible to improve the display quality.

Here, the frequency of the voltage (driving frequency of a panel) is the frequency when a repeating unit when voltages having different absolute values are alternately applied between a pair of electrodes is regarded as one cycle. The frequency of the voltage (driving frequency of a panel) is the frequency, for example, in FIG. 7 when the time from when the application of the voltage +V1 is started, then the voltage –V1 is applied after the voltage +V1, then the voltage +V2 is applied, and then the voltage –V2 is applied, until the time when the application of the voltage –V2 is ended is regarded as one cycle. That is, one cycle is configured by the regions R11, R12, R21, and R22 disposed consecutively.

The waveform of the voltage (also referred to as a driving waveform of a panel) is, for example, a rectangular wave as illustrated in FIG. 7, but may have other shapes as long as a desired effect is obtained.

As illustrated in FIGS. 1 and 2, the liquid crystal panel 10 of the present embodiment further includes a first polarizing plate 10P1 disposed on the observation side of the first substrate 110 and having a first absorption axis 10P1A, and when viewed in a plan view, the angle α formed by the director of the liquid crystal molecules 131 in a state with no voltage applied and the first absorption axis 10P1A is preferably 5° or more and 20° or less, or 65° or more and 80° or less. With such an aspect, in a narrow viewing angle mode, a polar angle (also referred to as a light shielding angle) at which the transmittance is minimized on the right side of the screen and a polar angle at which the transmittance is minimized on the left side of the screen can be different from each other, and it is possible to realize a viewing angle that is asymmetrical in the horizontal direction. In the narrow viewing angle mode, the light shielding angle on one side of the right side of the screen and the left side of the screen can be set to, for example, a polar angle of 40°, and it is possible to realize a sufficiently small light shielding angle on the one side. The liquid crystal panel 10 is suitable for, for example, an in-vehicle display for a passenger seat. By adjusting an angle α, the polar angle at which the transmittance is minimized can be made smaller.

The first substrate 110 included in the liquid crystal panel 10 of the present embodiment includes the first electrode 112, which is one electrode of the pair of electrodes, and the second substrate 150 includes the second electrode 152, which is the other electrode of the pair of electrodes. With such an aspect, it is possible to realize the liquid crystal panel 10 in an electrically controlled birefringence (ECB) mode.

More specifically, the liquid crystal panel 10 of the present embodiment is in the ECB mode, and when viewed in a plan view, the angle α formed between the director of the liquid crystal molecule 131 in a state with no voltage applied and the first absorption axis is 5° or more and 20° or less, or 65° or more and 80° or less. With such an aspect, when a voltage is applied to the ECB liquid crystal (liquid crystal layer 130), an asymmetrical viewing angle can be obtained on the right side of the screen and the left side of the screen. For example, by appropriately adjusting the angle α, it is possible to realize a polar angle (also referred to as a light shielding angle) at which the transmittance is minimized at a smaller angle.

In the liquid crystal panel in the ECB mode including the liquid crystal molecules having a positive anisotropy of dielectric constant, at the angle α=0° or 90°, there is a trade-off relationship between the light shielding angle and the retardation Re of the liquid crystal layer. Specifically, when Re of the liquid crystal layer=800 nm, the light shielding angle is about 45° at an optimum voltage. On the other hand, in order to obtain the light shielding angle of about 30°, Re=about 1600 nm is required, and either a double refractive index Δn or a cell thickness d of the liquid crystal layer needs to be increased. For example, when the cell thickness d is increased, it is necessary to set Δn=0.12 and d=13 μm, and when the double refractive index Δn is increased, it is necessary to set Δn=0.22 and d=7 μm.

However, there are issues in productivity and reliability in both a case of increasing the cell thickness d and a case of increasing the double refractive index Δn. In a case where the cell thickness d is increased, since the cell thickness is increased, there are issues in in-plane unevenness and a yield (performance stability). In a case where the double refractive index Δn is increased, it is possible to realize a high Δn by using a transistor-based material as a liquid crystal material, but there is an issue in that operation at low temperature becomes unstable. On the other hand, since it is not necessary to increase the cell thickness d and the double refractive index Δn in the liquid crystal panel 10 of the present embodiment, it is possible to make the light shielding angle sufficiently small in the narrow viewing angle mode without reducing productivity or reliability while suppressing unstable operation at low temperature.

Figure 8:
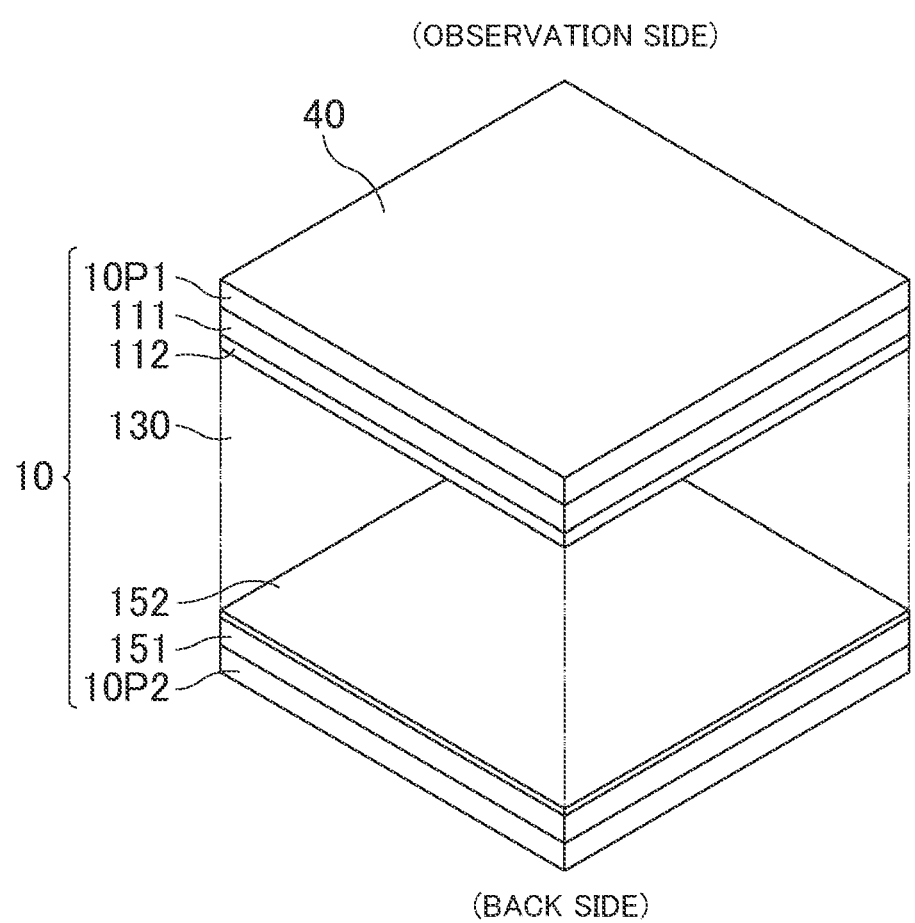
FIG. 8 is a schematic perspective view of the liquid crystal panel according to Embodiment 1.

FIG. 8 is a schematic perspective view of the liquid crystal panel according to Embodiment 1. In FIG. 8, a first alignment film 120 and a second alignment film 140 are omitted. As illustrated in FIGS. 1, 2, and 8, it is preferable that the liquid crystal panel 10 of the present embodiment further includes a second polarizing plate 10P2 having a second absorption axis parallel to the first absorption axis on the opposite side of the second substrate 150 from the liquid crystal layer 130. With such an aspect, the first polarizing plate 10P1 and the second polarizing plate 10P2 can be disposed in a parallel Nicol state, and when a backlight is disposed on the back side of the liquid crystal panel 10, it is possible to more effectively transmit backlight light from a low polar angle side to a high polar angle side in a state with no voltage applied.

More specifically, as illustrated in FIGS. 1, 2, and 8, the liquid crystal panel 10 of the present embodiment includes the first polarizing plate 10P1 having the first absorption axis, the first substrate 110 having a first support substrate 111 and the first electrode 112, the first alignment film 120, the liquid crystal layer 130 containing the liquid crystal molecules 131 having a positive anisotropy of dielectric constant, the second alignment film 140, the second substrate 150 having a second support substrate 151 and the second electrode 152, and the second polarizing plate 10P2 having a second absorption axis parallel to the first absorption axis, in order from the observation side to the back side. The liquid crystal panel of the present embodiment is a liquid crystal panel in an ECB mode using a nematic LC having a positive anisotropy of dielectric constant. In the liquid crystal panel 10, by changing a voltage applied between the first electrode 112 and the second electrode 152, the retardation of the liquid crystal layer 130 is changed, and it is possible to control light transmission or non-transmission of the liquid crystal layer 130.

The liquid crystal panel 10 is a passive liquid crystal panel that is passively driven. Similarly to a general passive liquid crystal panel, the first substrate 110 included in the liquid crystal panel 10 includes the first electrode 112 which is a solid electrode that covers the entire surface of a screen 40, and the second substrate 150 includes the second electrode 152 which is a solid electrode that covers the entire surface of the screen 40. With such an aspect, it is possible to perform switching between a public mode and a private mode on the entire screen 40.

Examples of the first support substrate 111 and the second support substrate 151 include substrates such as a glass substrate and a plastic substrate. Examples of the material of a glass substrate include glasses such as float glass and soda glass. Examples of the material of a plastic substrate include plastics such as polyethylene terephthalate, polybutylene terephthalate, polyether sulfone, polycarbonate, and alicyclic polyolefin.

The first electrode 112 and the second electrode 152 may be transparent electrodes, and for example, can be formed of a transparent conductive material such as indium tin oxide (ITO), indium zinc oxide (IZO), zinc oxide (ZnO), tin oxide (SnO), or an alloy thereof.

The first alignment film 120 and the second alignment film 140 control the alignment azimuth of the liquid crystal molecules 131 in a state with no voltage applied and the tilt angle of the liquid crystal molecules 131 in a state with no voltage applied. The first alignment film 120 and the second alignment film 140 may be a horizontal alignment film or a vertical alignment film, but from the viewpoint of improving the transmittance in a state with no voltage applied, the first alignment film 120 and the second alignment film 140 are preferably horizontal alignment films.

Here, when a substrate including the alignment film is used for a liquid crystal panel, the horizontal alignment film is an alignment film that exhibits an alignment regulating force that aligns liquid crystal molecules in the liquid crystal layer substantially horizontally with respect to the alignment film in a state with no voltage applied, in which no voltage is applied to the liquid crystal layer. Further, when a substrate including the alignment film is used for a liquid crystal panel, the vertical alignment film is an alignment film that exhibits an alignment regulating force that aligns liquid crystal molecules in the liquid crystal layer substantially vertically with respect to the alignment film in a state with no voltage applied, in which no voltage is applied to the liquid crystal layer.

Substantially horizontal alignment means that the tilt angle is 0° or more and 10° or less, preferably 0° or more and 5° or less, and more preferably 0° or more and 2° or less.

Substantially vertical alignment means that the tilt angle is 83° or more and 90° or less, preferably 85° or more and 90° or less, and more preferably 87.5° or more and 88.0° or less. In the present specification, the "tilt angle" does not mean the angle between the director of the liquid crystal molecules and the main surface of the substrate, but means the average value of the angles between the director of liquid crystal molecules and the main surface of the substrates (the first substrate and the above-described second substrate) in the thickness direction of the liquid crystal layer, and the angle parallel to the main surface of the substrate is 0°, and the angle normal to the main surface of the substrate is 90°. In particular, a tilt angle of the liquid crystal molecules in a state with no voltage applied is also referred to as a pretilt angle. The alignment azimuth of the liquid crystal molecules in a state with no voltage applied is also referred to as an initial alignment azimuth.

The tilt angle can be obtained by using a crystal rotation method, and can be obtained by using, for example, Axoscan (manufactured by Axometrics). In the present embodiment, the director of the liquid crystal molecules is the direction of the alignment principal axis (direction in which the molecular long axes are averagely aligned in the nematic LC). For example, in a plan view, the director of the liquid crystal molecules in a state with no voltage applied coincides with the alignment treatment direction of the alignment film.

As the materials of the first alignment film 120 and the second alignment film 140, common materials in the field of liquid crystal panels can be used, such as polymers with polyimide in the main chain, polymers with polyamic acid in the main chain, and polymers with polysiloxane in the main chain. The first alignment film 120 and the second alignment film 140 can be formed by applying alignment film materials, the coating method is not particularly limited, and for example, flexography printing, ink-jet coating, or the like can be used.

The first alignment film 120 and the second alignment film 140 may be photoalignment films that have a photofunctional group and have been subjected to a photoalignment treatment as an alignment treatment, may be rubbing alignment films that have been subjected to rubbing treatment as an alignment treatment, or may be alignment films that have not been subjected to alignment treatment.

The liquid crystal layer 130 contains the liquid crystal molecules 131. The alignment state of the liquid crystal molecules 131 changes according to the voltage applied to the liquid crystal layer 130, and thus the amount of light transmitted is controlled. The anisotropy of dielectric constant (As) of the liquid crystal molecules 131 is defined by the following Equation (L).

The liquid crystal molecule 131 preferably has a positive anisotropy of dielectric constant. With such an aspect, it is possible to reduce the driving voltage. Further, it is possible to operate the liquid crystal molecules 131 as a liquid crystal panel that is strong (highly reliable) in an external temperature environment. A liquid crystal molecule having a positive anisotropy of dielectric constant is referred to as a positive type liquid crystal molecule, and a liquid crystal molecule having a negative anisotropy of dielectric constant is referred to as a negative type liquid crystal molecule. The direction of the long axis of the liquid crystal molecule in a state with no voltage applied is also referred to as an initial alignment azimuth of the liquid crystal molecule.

$\Delta\varepsilon$=(dielectric constant in long-axis direction of liquid crystal molecule)−(dielectric constant in short-axis direction of liquid crystal molecule) (L)

The liquid crystal molecules 131 are homogeneously aligned in a state with no voltage applied. In the present specification, the homogeneous alignment refers to an alignment state where liquid crystal molecules 131 are horizontal to the substrate surface of the substrate that constitutes the liquid crystal panel (for example, at least one substrate surface of the first substrate 110 and the second substrate 150), and are also oriented in the same direction. The state with no voltage applied (when no voltage is applied) refers to a state in which a voltage equal to or more than a threshold value of the liquid crystal molecules is not applied to the liquid crystal layer, and for example, may be a state where the same constant voltage is applied to the first electrode 112 and the second electrode 152, or a state where a constant voltage is applied to one of the first electrode 112 and the second electrode 152, and a voltage that is less than the threshold value of the liquid crystal molecules with respect to the constant voltage is applied to the other electrode. The state with a voltage applied (during voltage application) refers to a state in which a voltage equal to or more than a threshold value of the liquid crystal molecules is applied to the liquid crystal layer.

Figure 9:
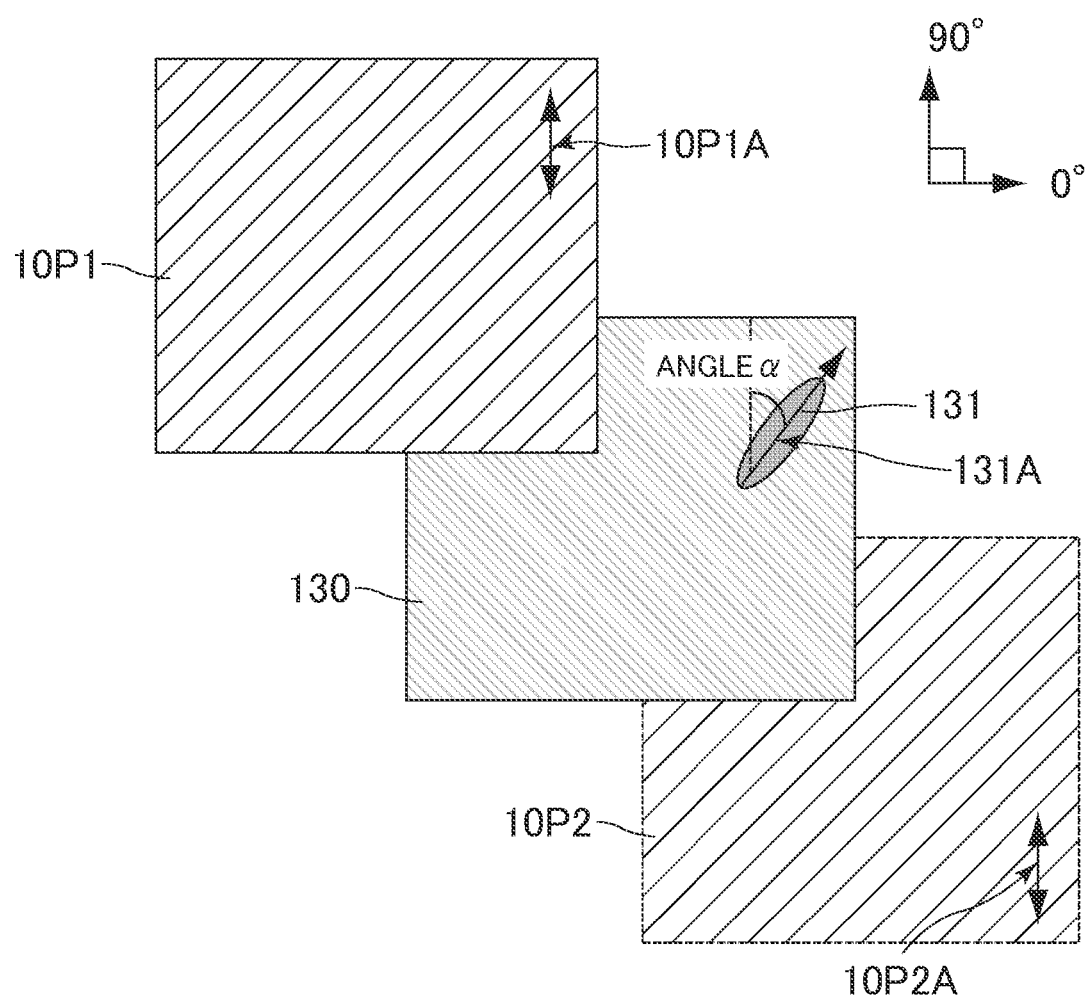
FIG. 9 is a schematic front view of the liquid crystal panel according to Embodiment 1.
Figure 10:
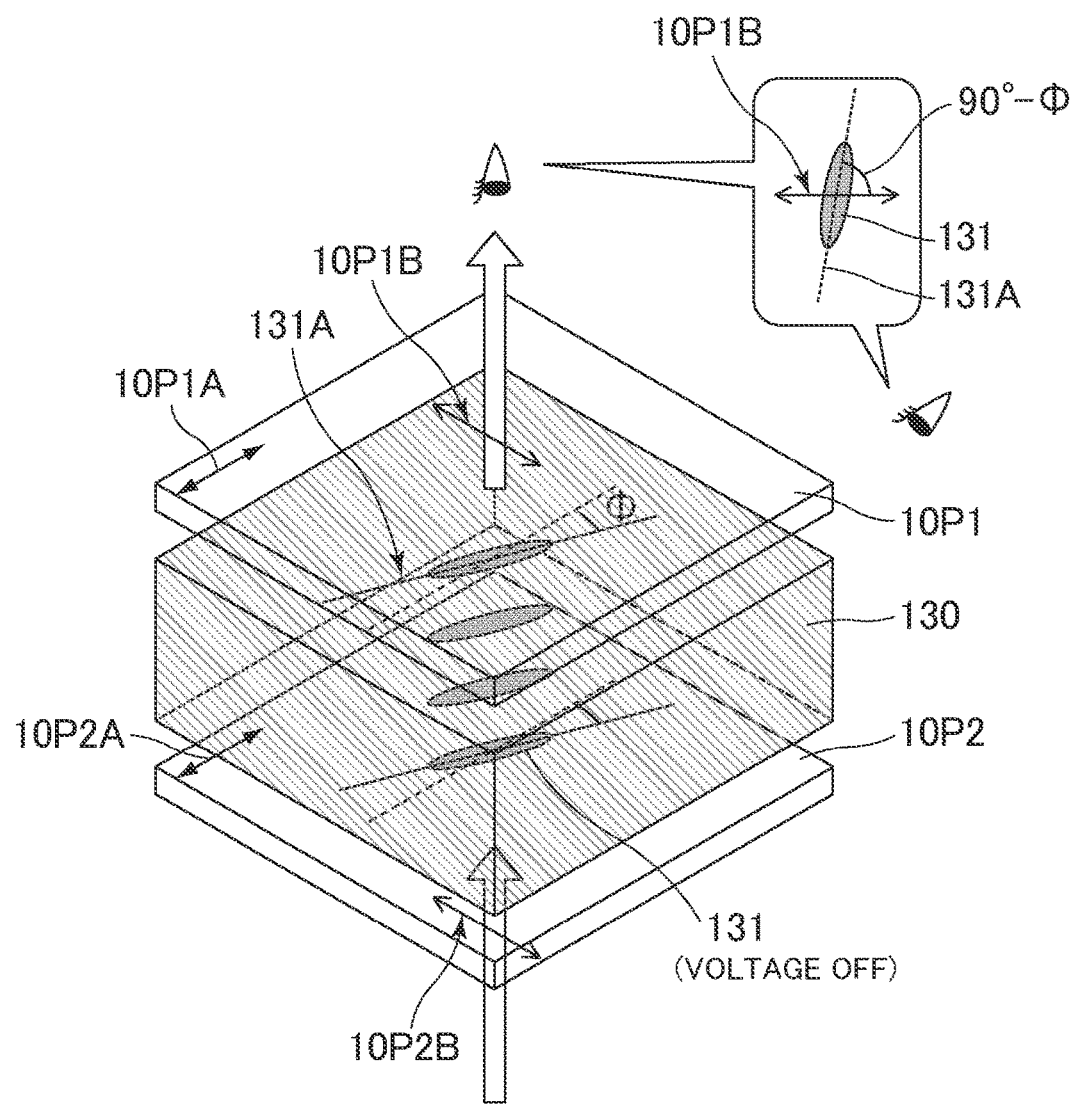
FIG. 10 is a schematic perspective view illustrating a relationship between a director and an absorption axis of a polarizing plate in a state with no voltage applied to liquid crystal molecules included in the liquid crystal panel according to Embodiment 1.
Figure 11:
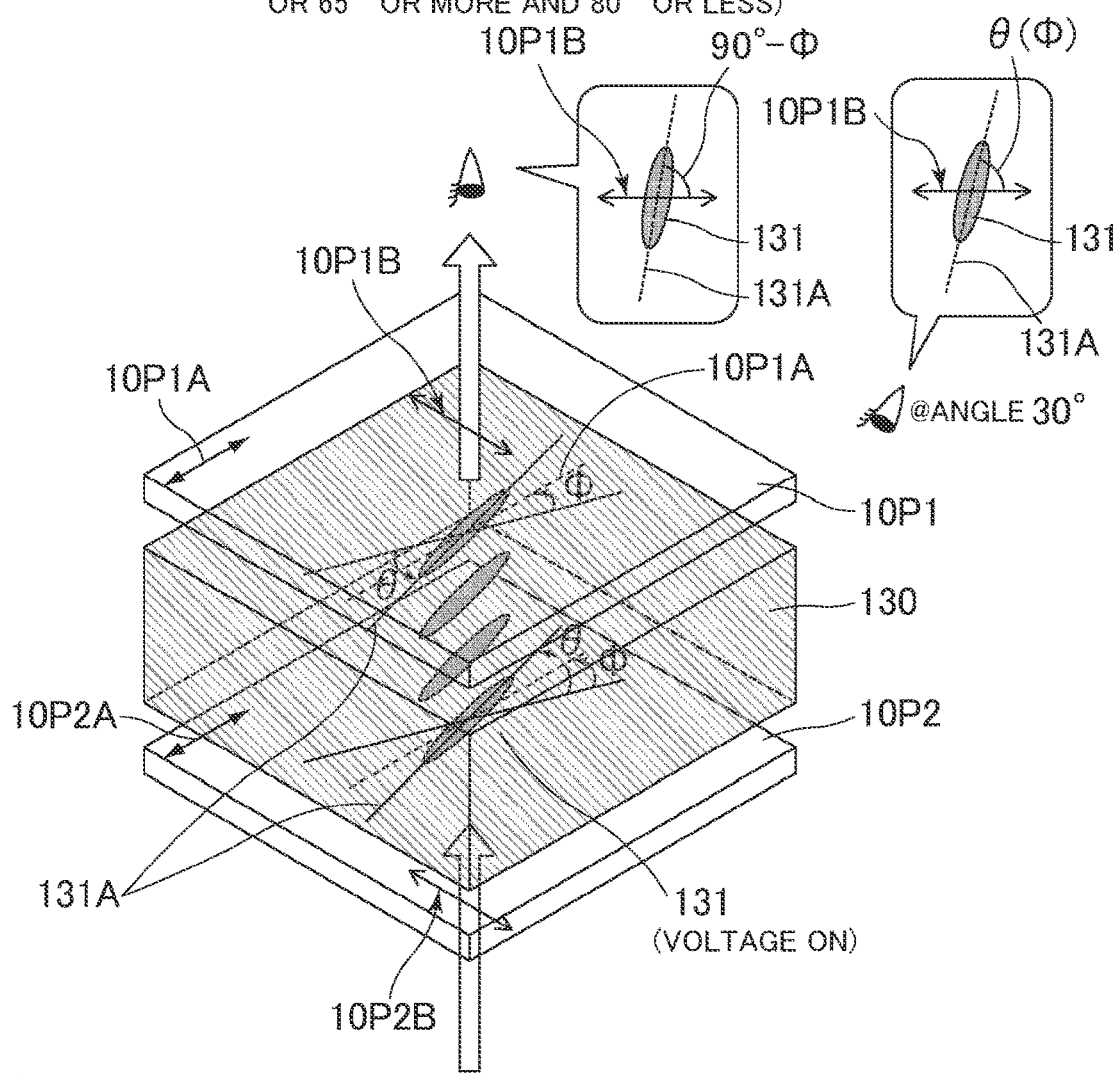
FIG. 11 is a schematic perspective view illustrating a relationship between a director and an absorption axis of the polarizing plate in a state with a voltage applied to the liquid crystal molecules included in the liquid crystal panel according to Embodiment 1.

FIG. 9 is a schematic front view of the liquid crystal panel according to Embodiment 1. FIG. 10 is a schematic perspective view illustrating a relationship between a director and an absorption axis of a polarizing plate in a state with no voltage applied to liquid crystal molecules included in the liquid crystal panel according to Embodiment 1. FIG. 11 is a schematic perspective view illustrating a relationship between a director and an absorption axis of the polarizing plate in a state with a voltage applied to the liquid crystal molecules included in the liquid crystal panel according to Embodiment 1.

As illustrated in FIG. 9, when viewed in a plan view, when an angle formed between a director 131A of the liquid crystal molecules 131 in a state with no voltage applied and the first absorption axis 10P1A of the first polarizing plate 10P1, $\alpha=\varphi$ (where $\alpha=5°$ or more and 20° or less, or 65° or more and 80° or less), in a state with no voltage applied, as illustrated in FIG. 10, whether observing from a polar angle of 0° or from a large polar angle, the angle between the director 131A of the liquid crystal molecules 131 and a first transmission axis 10P1B of the first polarizing plate 10P1 satisfies 90°−$\varphi$.

On the other hand, in a state with a voltage applied, as illustrated in FIG. 11, when observing from a polar angle of 0°, the angle between the director 131A of the liquid crystal molecules 131 and the first transmission axis 10P1B of the first polarizing plate 10P1 satisfies 90°−$\varphi$, but when observing from a large polar angle (for example, 30° polar angle), the angle between the director 131A of the liquid crystal molecules 131 and the first transmission axis 10P1B of the first polarizing plate 10P1 depends on the tilt angle θ and the angle $\varphi$ of the liquid crystal molecules 131, and is a different angle from that when observing from the front direction.

As described above, in the present embodiment, when viewed in a plan view, when the angle α between the director 131A of the liquid crystal molecules 131 in a state with no voltage applied and the first absorption axis 10P1A of the first polarizing plate 10P1 is 5° or more and 20° or less, or 65° or more and 80° or less, in a narrow viewing angle mode, it is possible to make the polar angle at which the transmittance is minimum on the right side of the screen (also referred to as a light shielding angle) different from the polar angle at which the transmittance is minimum on the left side of the screen, thereby realizing a viewing angle that is asymmetrical in the horizontal direction.

It is preferable that the tilt angle of the liquid crystal molecule 131 in a state with no voltage applied is 1° or more and 5° or less, and the tilt angle of the liquid crystal molecule 131 in a state with a voltage applied is 40° or more and 75° or less. With such an aspect, it is possible to further reduce the light shielding angle in a private mode. That is, it is possible to allow light shielding on a lower polar angle side. Here, in the present specification, the vertical direction to the display surface of the liquid crystal panel is a reference, and when close to the vertical direction, it is referred to as a lower polar angle side, and when farther away from the vertical direction, it is referred to as a higher polar angle side. In the present specification, a state with a voltage applied, in which a voltage equal to or more than a threshold value is applied between a pair of electrodes (between the first electrode 112 and the second electrode 152), is simply referred to as a "state with a voltage applied", and a state with no voltage applied, in which a voltage less than a threshold value is applied (including no voltage applied) between a pair of electrodes (between the first electrode 112 and the second electrode 152), is also simply referred to as a "state with no voltage applied". The voltage V1, the voltage −V1, the voltage V2, and the voltage −V2 are all voltages equal to or more than the threshold values.

The double refractive index Δn of the liquid crystal molecule 131 may be 0.08 or more and 0.24 or less. From the viewpoint of high reliability (high voltage holding ratio, wide operating temperature range), Δn is preferably 0.08 or more and 0.16 or less.

The thickness (cell thickness) d of the liquid crystal layer 130 is preferably 3 μm or more and 10 μm or less. With such an aspect, it is possible to increase the response speed of the liquid crystal molecule 131. Further, it is possible to reduce the thickness of the liquid crystal panel 10. From the viewpoint of thinning, the thickness d of the liquid crystal layer 130 is more preferably 3 μm or more and 5 μm or less. From the viewpoint of yield, the thickness d of the liquid crystal layer 130 is more preferably 5 μm or more and 10 μm or less. When the thickness d of the liquid crystal layer 130 is 5 μm or more, it is possible to make display unevenness less visible when foreign matter is mixed in, improving the yield.

The retardation Re of the liquid crystal layer 130 in a state with a voltage applied is preferably 600 nm or more and 1000 nm or less. With such an aspect, it is possible to ensure the production stability as well as the sufficient light shielding performance. The retardation Re of the liquid crystal layer 130 is expressed by a product of the double refractive index (Δn) of the liquid crystal molecule and the thickness (d) of the liquid crystal layer.

The first polarizing plate 10P1 and the second polarizing plate 10P2 are both absorption type polarizers. As the first polarizing plate 10P1 and the second polarizing plate 10P2, for example, it is possible to use a polarizer (absorption type polarizing plate) which is obtained by dyeing and adsorbing an anisotropic material such as an iodine complex (or dye) to a polyvinyl alcohol (PVA) film, and then stretching and aligning the film.

The first polarizing plate 10P1 has the first absorption axis 10P1A and the first transmission axis 10P1B orthogonal to the first absorption axis 10P1A. The second polarizing plate 10P2 has a second absorption axis 10P2A and a second transmission axis 10P2B orthogonal to the second absorption axis 10P2A.

It is preferable that the second absorption axis 10P2A is parallel to the first absorption axis 10P1A. For example, the axial azimuth of the first absorption axis 10P1A and the second absorption axis 10P2A is set to 90°.

In the present embodiment, the case where the liquid crystal panel 10 can switch between a public mode and a private mode is described as an example, but the liquid crystal panel 10 may function as a private mode at all times. Even in such a case, when the observer visually recognizes from the upper side of the screen or the lower side of the screen, it is possible to suppress the deterioration of the light shielding property in the horizontal direction.

Modification Example 1 of Embodiment 1

The configurations other than those described in the present modification example are the same as those of Embodiment 1. Further, for convenience of description, members having the same functions as those illustrated in the drawings of Embodiment 1 will be designated by the same reference numerals, and description thereof will be omitted.

Figure 12:
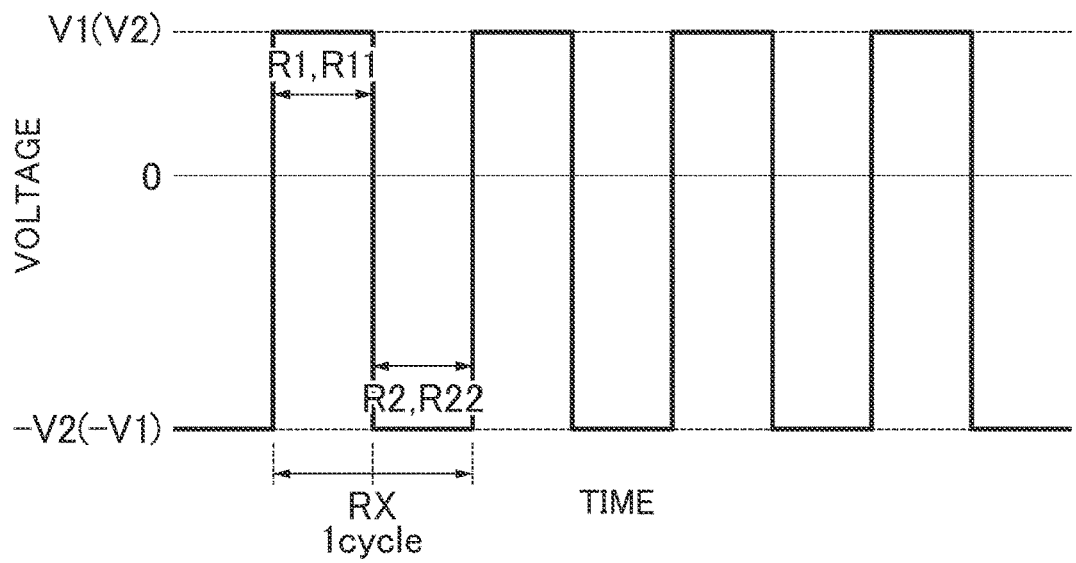
FIG. 12 is a graph illustrating an example of a waveform of a voltage applied between a pair of electrodes included in a liquid crystal panel according to Modification Example 1 of Embodiment 1.

FIG. 12 is a graph illustrating an example of a waveform of a voltage applied between a pair of electrodes included in a liquid crystal panel according to Modification Example 1 of Embodiment 1. In the present embodiment, as illustrated in FIG. 12, the first absolute value corresponds to V1, and the second absolute value corresponds to V2. V1 and V2 are positive values.

As illustrated in FIG. 12, a waveform of the voltage applied between the pair of electrodes included in the liquid crystal panel of the present modification example alternately has a region R1 corresponding to the first voltage and a region R2 corresponding to the second voltage. In the waveform of the voltage applied between the pair of electrodes of the present modification example, the region R1 corresponding to the first voltage is the region R11 to which the voltage V1 is applied, and the region R2 corresponding to the second voltage is the region R22 to which the voltage −V2 is applied.

As illustrated in FIG. 12, the first voltage in the present modification example is the voltage V1 that has the first absolute value and is a positive value, the second voltage is the voltage −V2 that has the second absolute value and is a negative value, and the voltage control unit 300 repeatedly applies the voltage V1 and the voltage −V2 between the pair of electrodes in order. With such an aspect, when the observer visually recognizes from the upper side of the screen or the lower side of the screen, it is possible to more effectively suppress the deterioration of the light shielding property in the horizontal direction.

In the present modification example, a voltage value is changed depending on whether the driving voltage is positive or negative. With such driving, the same effect as that of Embodiment 1 can be obtained without applying a complex signal.

It is appropriately set a frequency of the voltage applied between the pair of electrodes (also referred to as a driving frequency of a panel). The driving frequency of the panel is, for example, 30 Hz or more and 300 Hz or less, preferably 45 Hz or more and 240 Hz or less, and more preferably 60 Hz or more and 120 Hz or less. Since the driving frequency of the panel is 300 Hz or less, it is possible to sufficiently drive the liquid crystal molecules. Since the driving frequency of the panel is 60 Hz or more, it is possible to improve the display quality.

The frequency of the voltage (driving frequency of a panel) in the present modification example is the frequency, for example, in FIG. 12 when the time from when the application of the voltage +V1 is started, then the voltage −V2 is applied after the voltage +V1, until the time when the application of the voltage −V2 is ended is regarded as one cycle. That is, one cycle is configured by the regions R11 and R22 disposed consecutively.

In the present modification example, an aspect has been described in which the first voltage is the voltage V1 that has the first absolute value and is a positive value, the second voltage is the voltage −V2 that has the second absolute value and is a negative value, and the voltage control unit 300 repeatedly applies the voltage V1 and the voltage −V2 between the pair of electrodes in order, but even if the first voltage is the voltage −V1 that has the first absolute value and is a negative value, the second voltage is the voltage V2 that has the second absolute value and is a positive value, and the voltage control unit 300 repeatedly applies the voltage −V1 and the voltage V2 between the pair of electrodes in order, the same effect can be obtained.

Modification Example 2 of Embodiment 1

Configurations other than those described in the present modification example are the same as those of Embodiment 1 and the modification examples thereof. Further, for convenience of description, members having the same functions as those illustrated in the drawings of Embodiment 1 and the modification examples thereof will be designated by the same reference numerals, and description thereof will be omitted.

The voltage control unit 300 of the present modification example performs control to repeatedly apply the first voltage, the second voltage, and a third voltage having a third absolute value different from the first absolute value and the second absolute value between the pair of electrodes in order. With such an aspect, when the observer visually recognizes from the upper side of the screen or the lower side of the screen, it is possible to further more effectively suppress the deterioration of the light shielding property in the horizontal direction.

The third absolute value is preferably 1.05 times or more and 1.20 times or less the second absolute value. It is more preferable that the second absolute value is 1.05 times or more and 1.20 times or less the first absolute value, and the third absolute value is 1.05 times or more and 1.20 times or less the second absolute value.

For example, as in a case where the first absolute value is 3, the second absolute value is 3.2, and the third absolute value is 3.4, it is preferable that the second absolute value is 1.05 times or more and 1.10 times or less the first absolute value, and the third absolute value is 1.05 times or more and 1.10 times or less the second absolute value.

Further, as in a case where the first absolute value is 3, the second absolute value is 3.5, and the third absolute value is 4.0, it is preferable that the second absolute value is 1.10 times or more and 1.20 times or less the first absolute value, and the third absolute value is 1.10 times or more and 1.20 times or less the second absolute value. The above is an example, and the relationship between the first absolute value, the second absolute value, and the third absolute value can be freely set as long as a desired effect is obtained.

Figure 13:
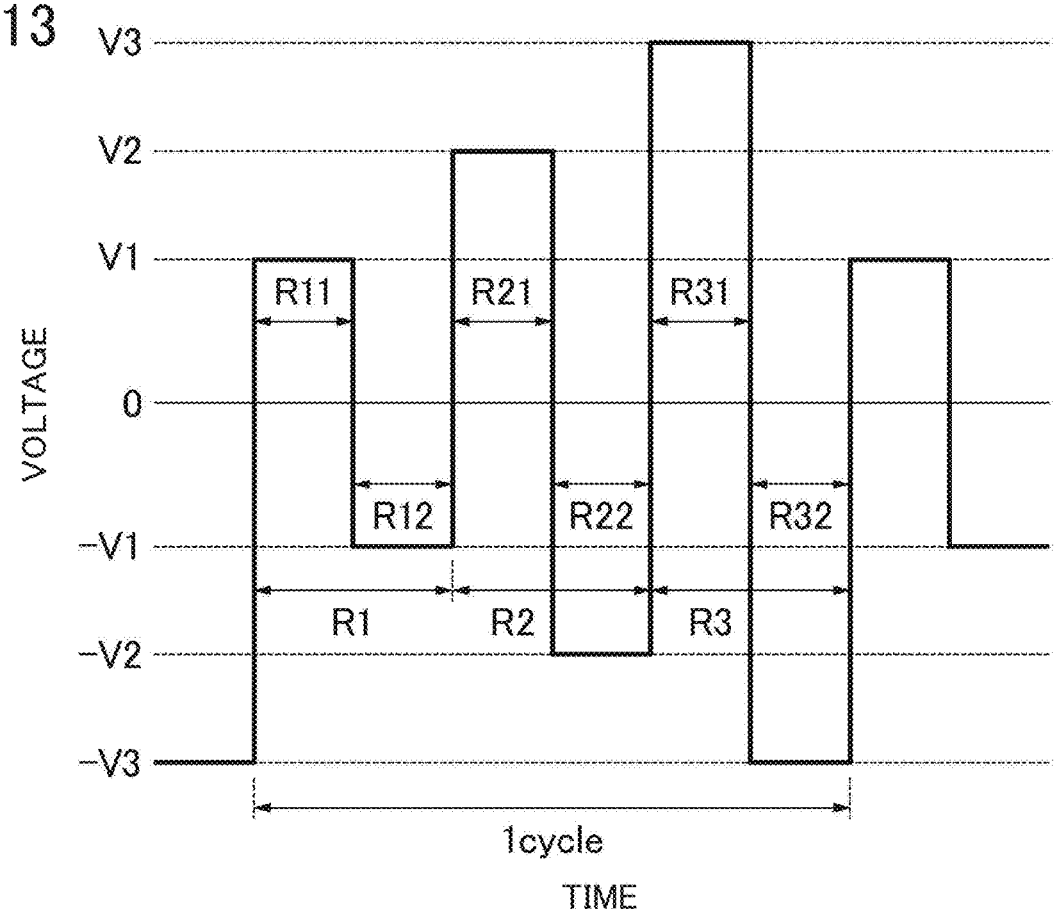
FIG. 13 is a graph illustrating an example of a waveform of a voltage applied between a pair of electrodes included in a liquid crystal panel according to Modification Example 2 of Embodiment 1.

FIG. 13 is a graph illustrating an example of a waveform of a voltage applied between a pair of electrodes included in a liquid crystal panel according to Modification Example 2 of Embodiment 1. In the present modification example, as illustrated in FIG. 13, the first absolute value corresponds to V1, the second absolute value corresponds to V2, and the third absolute value corresponds to V3. V1, V2, and V3 are positive values.

The voltage V1 is generally set to 2.5 V or more and 5 V or less. Here, as in a case where the voltage V1 is 3 V, the voltage V2 is 3.2 V, and a voltage V3 is 3.4 V, it is preferable that the voltage V2 is set to a voltage higher than the voltage V1 by 5% or more and 10% or less, and the voltage V3 is set to a voltage higher than the voltage V2 by 5% or more and 10% or less.

Further, as in a case where the voltage V1 is 3 V, the voltage V2 is 3.5 V, and the voltage V3 is 4.0 V, it is also preferable that the voltage V2 is set to a voltage higher than the voltage V1 by 10% or more and 20% or less, and the voltage V3 is set to a voltage higher than the voltage V2 by 10% or more and 20% or less. The above is an example, and the relationship between the voltage V1, the voltage V2, and the voltage V3 can be freely set as long as the desired effect is obtained.

As illustrated in FIG. 13, the waveform of the voltage applied between a pair of electrodes included in the liquid crystal panel of the present modification example has the region R1 corresponding to the first voltage, the region R2 corresponding to the second voltage, and a region R3 corresponding to the third voltage repeated in this order repeatedly. The region R1 corresponding to the first voltage is a region to which the first voltage is continuously applied, the region R2 corresponding to the second voltage is a region to which the second voltage is continuously applied, and the region R3 corresponding to the third voltage is a region to which the third voltage is continuously applied.

In the present modification example, in the waveform of the voltage applied between a pair of electrodes, the region R1 corresponding to the first voltage includes the region R11 to which the voltage V1 is applied and the region R12 to which the voltage −V1 is applied, the region R2 corresponding to the second voltage includes the region R21 to which the voltage V2 is applied and the region R22 to which the voltage −V2 is applied, and the region R3 corresponding to the third voltage includes a region R31 to which the voltage V3 is applied and a region R32 to which the voltage −V3 is applied.

The region R11 to which the voltage V1 is applied is a region to which the voltage V1 is continuously applied, the region R12 to which the voltage −V1 is applied is a region to which the voltage −V1 is continuously applied, the region R21 to which the voltage V2 is applied is a region to which the voltage V2 is continuously applied, the region R22 to which the voltage −V2 is applied is a region to which the voltage −V2 is continuously applied, the region R31 to which the voltage V3 is applied is a region to which the voltage V3 is continuously applied, and the region R32 to which the voltage −V3 is applied is a region to which the voltage −V3 is continuously applied.

As illustrated in FIG. 13, the first voltage of the present embodiment includes the voltage V1 that has the first absolute value and is a positive value, and the voltage −V1 that has the first absolute value and is a negative value, the second voltage includes the voltage V2 that has the second absolute value and is a positive value, and the voltage −V2 that has the second absolute value and is a negative value, the third voltage includes the voltage V3 that has the third absolute value and is a positive value, and the voltage −V3 that has the third absolute value and is a negative value, and the voltage control unit 300 repeatedly applies the voltage V1, the voltage −V1, the voltage V2, the voltage −V2, the voltage V3, and the voltage −V3 in this order between the pair of electrodes.

In the present modification example, a case where the first voltage, the second voltage, and the third voltage are repeatedly applied in this order will be described as an example, but it is possible to change the order of the voltages to be applied as appropriate.

It is appropriately set a frequency of the voltage applied between the pair of electrodes (also referred to as a driving frequency of a panel). The driving frequency of the panel is, for example, 30 Hz or more and 300 Hz or less, preferably 45 Hz or more and 240 Hz or less, and more preferably 60 Hz or more and 120 Hz or less. Since the driving frequency of the panel is 300 Hz or less, it is possible to sufficiently drive the liquid crystal molecules. Since the driving frequency of the panel is 60 Hz or more, it is possible to improve the display quality.

The frequency of the voltage (driving frequency of a panel) according to the present modification example is the frequency, for example, in FIG. 13 when the time from when the application of the voltage +V1 is started, then the voltage −V1 is applied after the voltage +V1, then the voltage +V2 is applied, then the voltage −V2 is applied, then the voltage +V3 is applied, and then the voltage −V3 is applied, until the time when the application of the voltage −V3 is ended is regarded as one cycle. That is, one cycle is configured by the regions R11, R12, R21, R22, R31, and R32 disposed consecutively.

The waveform of the voltage (also referred to as a driving waveform of a panel) is, for example, a rectangular wave as illustrated in FIG. 13, but may have other shapes as long as a desired effect is obtained.

Modification Example 3 of Embodiment 1

Configurations other than those described in the present modification example are the same as those of Embodiment 1 and the modification examples thereof. Further, for convenience of description, members having the same functions as those illustrated in the drawings of Embodiment 1 and the modification examples thereof will be designated by the same reference numerals, and description thereof will be omitted.

The voltage control unit 300 of the present modification example makes the time during which the first voltage is applied and the time during which the second voltage is applied different from each other. With such an aspect, when the observer visually recognizes from the upper side of the screen or the lower side of the screen, it is possible to further more effectively suppress the deterioration of the light shielding property in the horizontal direction. Here, the time during which the first voltage is applied is the total time of each region R1 corresponding to the first voltage, and the time during which the second voltage is applied is the total time of each region R2 corresponding to the second voltage.

That is, the voltage control unit 300 of the present modification example sets a ratio (also referred to as application ratio) between the time during which the first voltage is applied and the time during which the second voltage is applied to a value other than 1:1. The voltage control unit 300 of the present modification example preferably sets, for example, a ratio (also referred to as an application ratio) between the time during which the first voltage is applied and the time during which the second voltage is preferably set to 4:1 to 8:1, more preferably 5:1 to 7:1, and even more preferably 6:1.

Modification Example 4 of Embodiment 1

Configurations other than those described in the present modification example are the same as those of Embodiment 1 and the modification examples thereof. Further, for convenience of description, members having the same functions as those illustrated in the drawings of Embodiment 1 and the modification examples thereof will be designated by the same reference numerals, and description thereof will be omitted.

Figure 14:
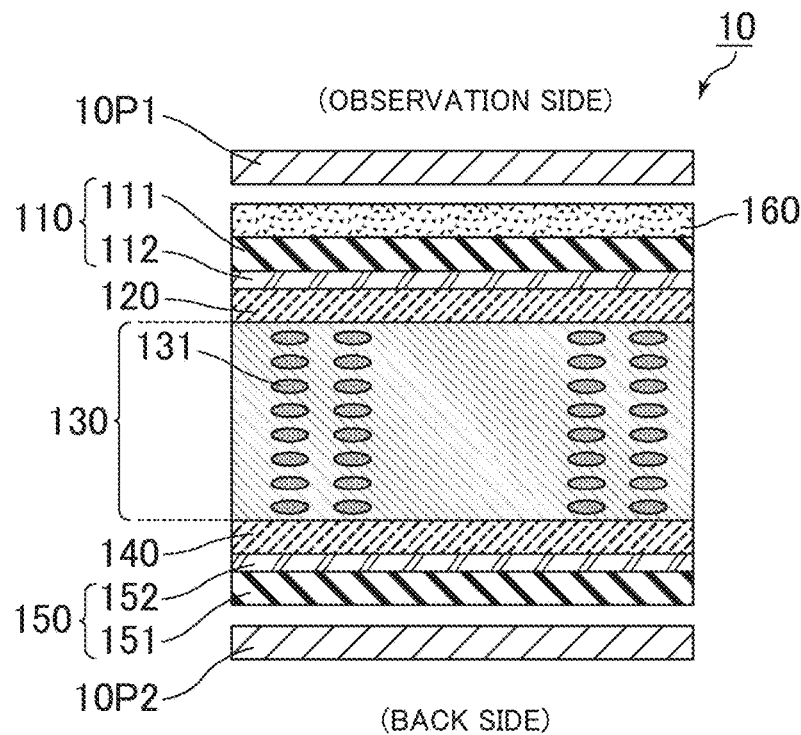
FIG. 14 is a schematic cross-sectional view of a liquid crystal panel according to Modification Example 4 of Embodiment 1.

FIG. 14 is a schematic cross-sectional view of a liquid crystal panel according to Modification Example 4 of Embodiment 1. As illustrated in FIG. 14, the liquid crystal panel 10 preferably further includes a negative C plate 160 having the retardation Rth of 500 nm or more in the thickness direction. With such an aspect, it is possible to make the light shielding angle smaller in a narrow viewing angle mode. The negative C plate 160 is a phase difference plate. The negative C plate 160 may be a single layer or a laminate including a plurality of layers.

The retardation Rth of the negative C plate 160 in the thickness direction is more preferably 500 nm or more, and even more preferably 550 nm or more. The upper limit of the retardation Rth of the negative C plate 160 in the thickness direction is not particularly limited, but is, for example, 1,000 nm or less.

Examples of the negative C plate include a stretched cyclo-olefin polymer film.

Modification Example 5 of Embodiment 1

Configurations other than those described in the present modification example are the same as those of Embodiment 1 and the modification examples thereof. Further, for convenience of description, members having the same functions as those illustrated in the drawings of Embodiment 1 and the modification examples thereof will be designated by the same reference numerals, and description thereof will be omitted.

The liquid crystal panel 10 of Embodiment 1 and the modification examples thereof described above is a passive liquid crystal panel that is passively driven, but the liquid crystal panel 10 is not limited thereto, and may be, for example, an active matrix liquid crystal panel that is driven by active matrix.

Figure 15:
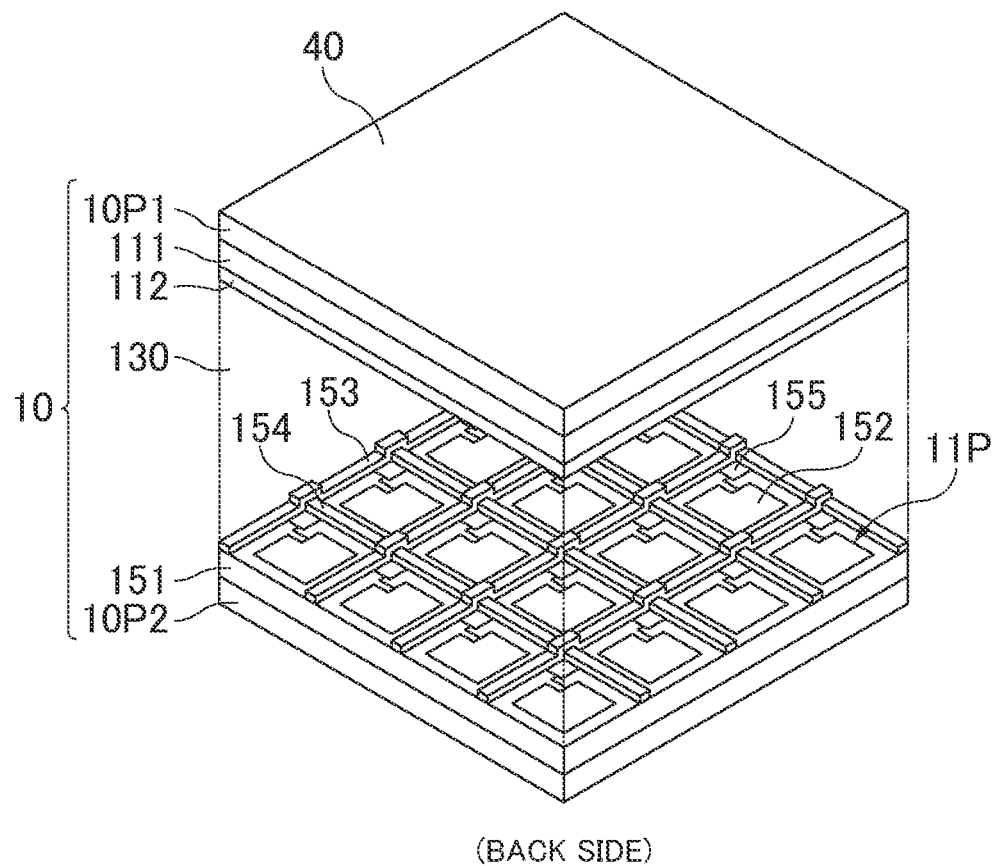
FIG. 15 is a schematic perspective view of a liquid crystal panel according to Modification Example 5 of Embodiment 1.

FIG. 15 is a schematic perspective view of a liquid crystal panel according to Modification Example 5 of Embodiment 1. The liquid crystal panel 10 according to the present modification example illustrated in FIG. 15 is an active matrix liquid crystal panel driven by an active matrix. With such an aspect, it is possible to perform switching between a public mode and a private mode partially instead of the entire screen.

In the second substrate 150 included in the liquid crystal panel 10, similarly to a general active matrix liquid crystal panel, a gate line 153 and a source line 154 orthogonal to each other are disposed to form a lattice, and near the intersection thereof, a thin film transistor (TFT) 155 as a switching element is provided. A region surrounded by the gate line 153 and the source line 154 forms pixels 11P, and each pixel 11P is provided with a pixel electrode coupled to the TFT 155 as the second electrode 152.

On the other hand, a common electrode which is a solid electrode that covers the entire surface of the screen 40 is provided as the first electrode 112 on the first substrate 110 facing the second substrate 150.

A driving method of the liquid crystal panel 10 is not particularly limited, and for example, a commonly used active matrix drive method can be used. That is, the TFT 155 provided in each pixel is switched (turned on and off) via a gate driver. In synchronization with this switching, a voltage is applied to the pixel to be turned on via a source driver, and electric charges are accumulated in a storage capacitor in each pixel via a drain bus of the TFT 155. Then, the pixel is kept in the on-state by the storage capacitor.

The gate line 153 is a wiring coupled to a gate electrode of the TFT 155 (generally, a bus line coupled to a plurality of gate electrodes), and a scanning signal (a signal that controls the on-state and off-state of the TFT) is applied to the gate electrode of the coupled TFT 155. The source line 154 is a wiring coupled to a source electrode of the TFT 155 (generally, a bus line coupled to a plurality of source electrodes), and a data signal (for example, a video signal) is applied to the coupled TFT 155. Usually, one of the gate line 153 and the source line 154 is disposed linearly to vertically cross an array region in which the TFTs 155 are arranged in a matrix, and the other is disposed linearly to cross the array region.

Various wirings and electrodes constituting the gate line 153, the source line 154, and the TFT 155 can be formed by forming a single layer or multiple layers of metals such as copper, titanium, aluminum, molybdenum, tungsten, or alloys thereof by sputtering, and then patterning by photolithography, and the like. Manufacturing is improved by using the same material for these various wirings and electrodes formed in the same layer.

Modification Example 6 of Embodiment 1

Configurations other than those described in the present modification example are the same as those of Embodiment 1 and the modification examples thereof. Further, for convenience of description, members having the same functions as those illustrated in the drawings of Embodiment 1 and the modification examples thereof will be designated by the same reference numerals, and description thereof will be omitted.

Figure 16:
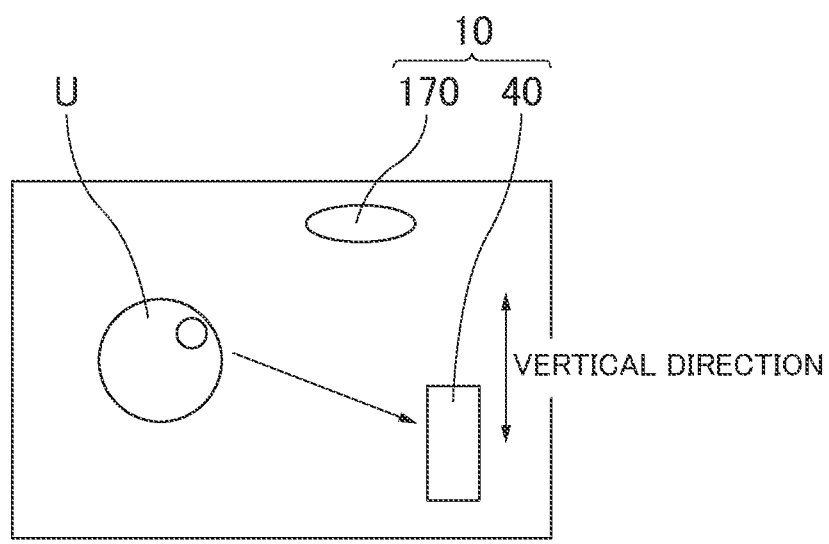
FIG. 16 is a schematic view illustrating a case where an inside of a vehicle equipped with a liquid crystal panel according to Modification Example 6 of Embodiment 1 is viewed from the side of a driver.
Figure 17:
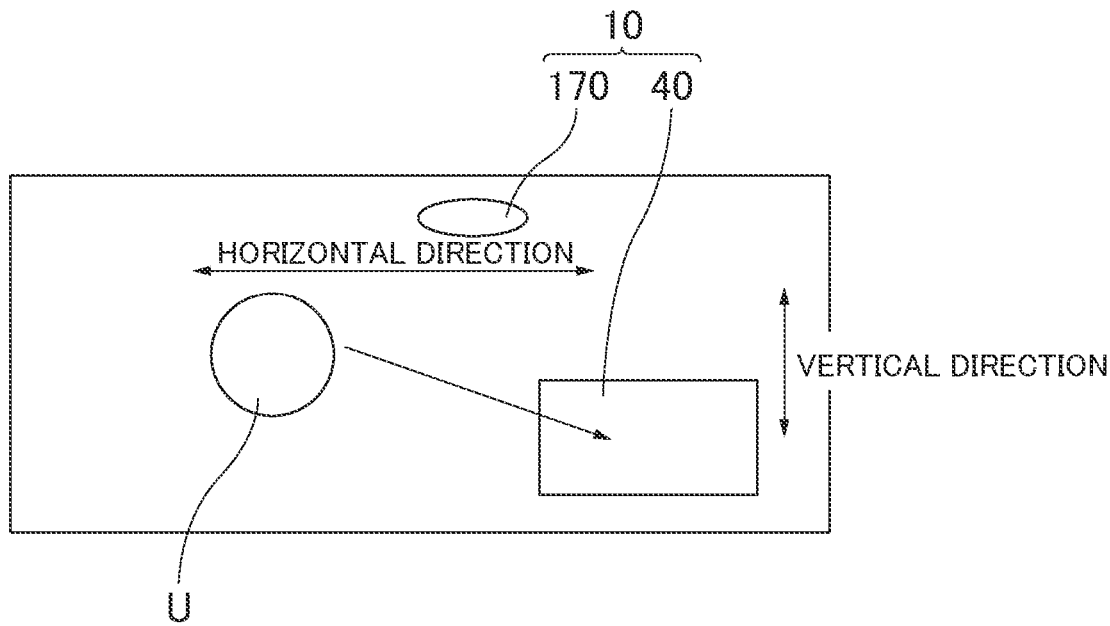
FIG. 17 is a schematic view illustrating a case where the inside of a vehicle equipped with the liquid crystal panel according to Modification Example 6 of Embodiment 1 is viewed from the rear of the driver.
Figure 18:
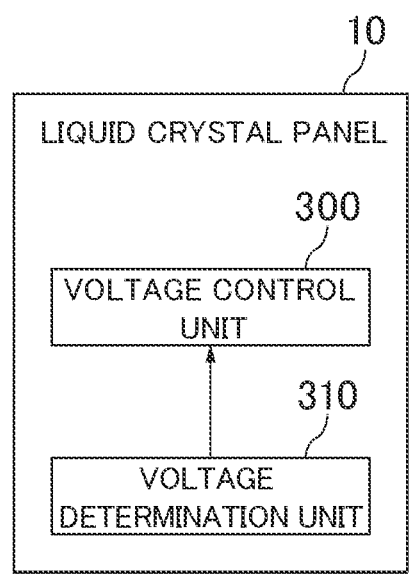
FIG. 18 is a block view schematically illustrating the liquid crystal panel according to Modification Example 6 of Embodiment 1.

FIG. 16 is a schematic view illustrating a case where an inside of a vehicle equipped with a liquid crystal panel according to Modification Example 6 of Embodiment 1 is viewed from the side of a driver. FIG. 17 is a schematic view illustrating a case where the inside of a vehicle equipped with the liquid crystal panel according to Modification Example 6 of Embodiment 1 is viewed from the rear of the driver. FIG. 18 is a block view schematically illustrating the liquid crystal panel according to Modification Example 6 of Embodiment 1.

As illustrated in FIGS. 16 and 17, the liquid crystal panel 10 according to the present modification example may further include a line of sight detection sensor 170 that senses the line of sight of an observer U (for example, a driver). Here, the liquid crystal panel 10 can change the light shielding intensity in the vertical direction according to the voltage applied between a pair of electrodes. Therefore, the liquid crystal panel 10 further includes the line of sight detection sensor 170 that senses the line of sight of the observer U (for example, a driver) such that the maximum light shielding performance can be obtained at the position of the line of sight of the observer U, and it is possible to determine the voltage of the liquid crystal panel 10 and improve the light shielding performance according to the position of the line of sight of the observer U.

In Embodiment 1 and its modification examples thereof, a good light shielding performance can be obtained regardless of the position of the line of sight of the driver, but the liquid crystal panel 10 according to the present modification example includes the line of sight detection sensor 170 such that the light shielding performance can be effectively improved according to the position of the line of sight of the observer U, and it is possible to realize good light shielding performance for the observer U.

The line of sight detection sensor 170 has a function of detecting the position of the line of sight of the observer U. The line of sight detection sensor 170 may be disposed on the screen 40 of the liquid crystal panel 10 or may be disposed outside the screen 40 of the liquid crystal panel 10. The line of sight detection sensor 170 is disposed, for example, outside the screen 40 of the liquid crystal panel 10 and on the front upper side of the observer.

The line of sight detection sensor 170 includes, for example, a web camera for checking the state of a target (observer U) and a detection system for detecting a line of sight of the target (observer U), and can detect the line of sight by performing image processing on an obtained image. This is an example of the line of sight detection sensor 170, and any devices can be used as long as the means can sense a line of sight.

As illustrated in FIG. 18, the liquid crystal panel 10 may further include a voltage determination unit 310 having a function of determining a voltage at which the maximum light shielding performance at the position of the eye line of the observer U obtained by the line of sight detection sensor 170 is obtained. In this case, the voltage control unit 300 controls the voltage to be applied to the pair of electrodes based on the voltage determined by the voltage determination unit.

Embodiment 2

In the present embodiment, characteristics unique to the present embodiment will be mainly described, and description of contents overlapping with those of Embodiment 1 and the modification examples thereof will be omitted. The present embodiment relates to a display device including the liquid crystal panel 10 according to any one of Embodiment 1 and modification examples thereof, and a display panel. In the present embodiment, in particular, a case where the liquid crystal panel 10 of Embodiment 1 is used will be described as an example.

Figure 19:
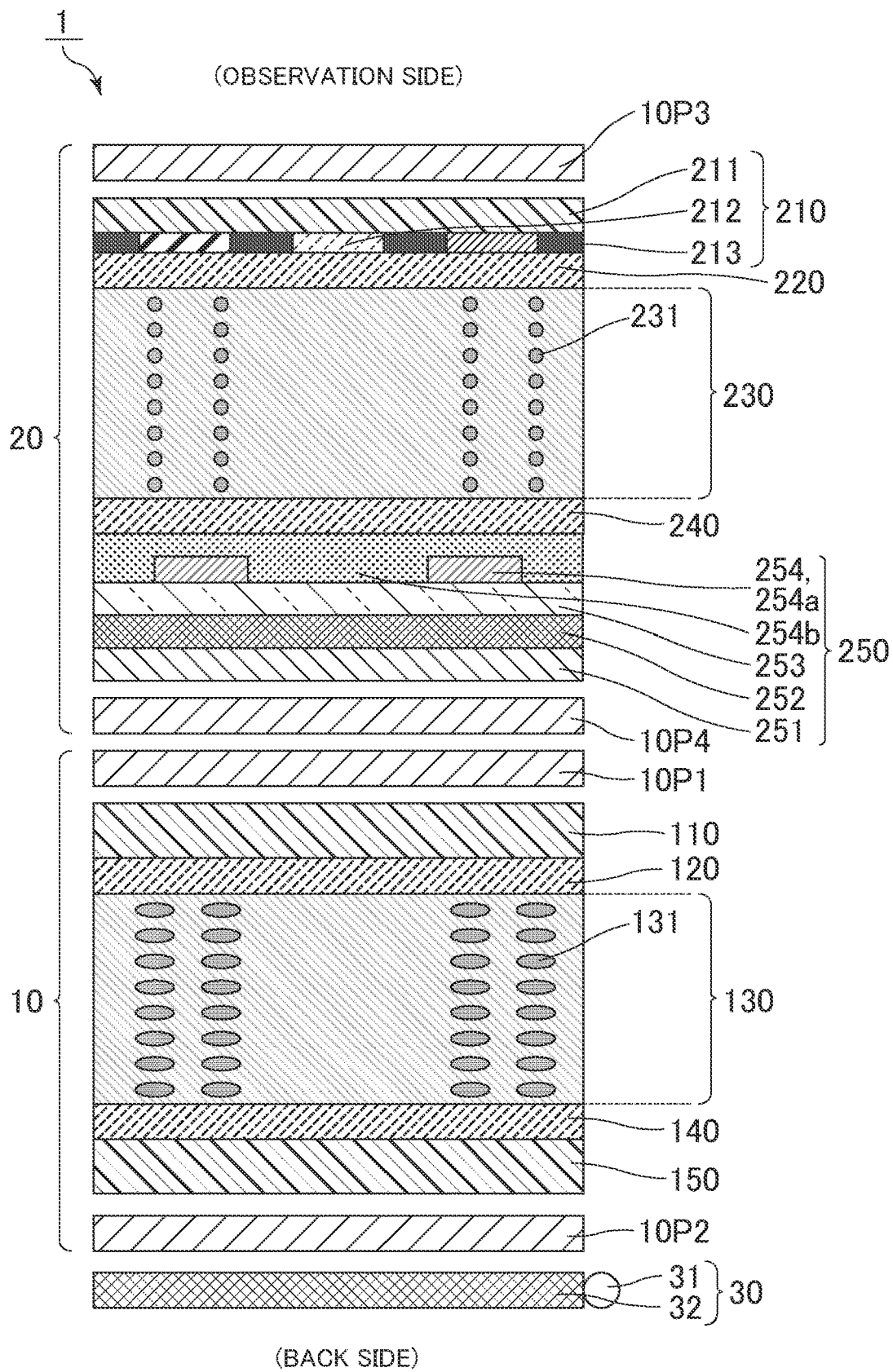
FIG. 19 is a schematic cross-sectional view of a display device according to Embodiment 2.
Figure 20:
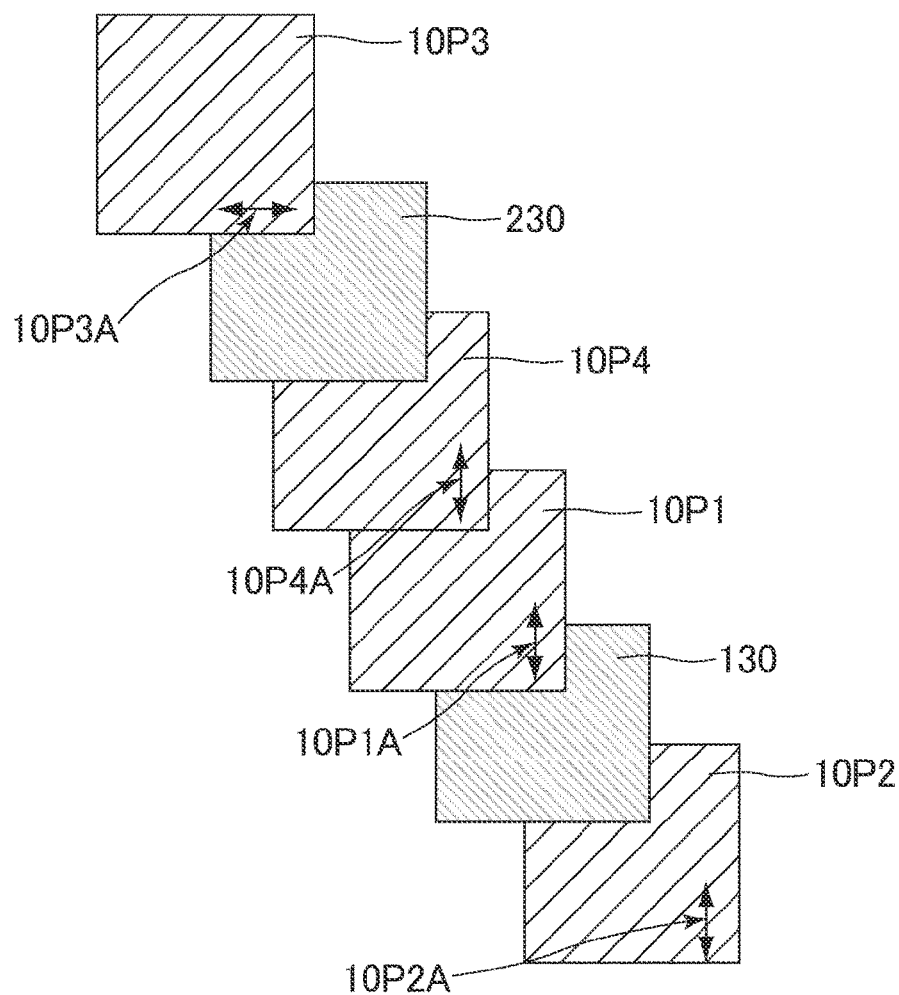
FIG. 20 is a schematic front view of the display device according to Embodiment 2.

FIG. 19 is a schematic cross-sectional view of a display device according to Embodiment 2. FIG. 20 is a schematic front view of the display device according to Embodiment 2. As illustrated in FIGS. 19 and 20, the display device 1 according to the present embodiment includes the liquid crystal panel 10 according to Embodiment 1 and a liquid crystal display panel 20 as the display panel. The display device 1 of the present embodiment is a viewing angle control liquid crystal display device of a dual-cell method. With such an aspect, in a state with no voltage applied, in which a voltage equal to or more than a threshold value of the liquid crystal molecules 131 is not applied to the liquid crystal layer 130, the liquid crystal panel 10 functions in a wide viewing angle mode, and images displayed on the liquid crystal display panel 20 can be viewed at a wide viewing angle. In a state with a voltage applied, in which a voltage equal to or more than a threshold value of the liquid crystal molecules 131 is applied to the liquid crystal layer 130, in the liquid crystal panel 10, the polar angle at which the transmittance is minimum on the right side of the screen (also referred to as a light shielding angle) can be made different from the polar angle at which the transmittance is minimum at the left side of the screen, thereby realizing an asymmetric viewing angle in the horizontal direction. In a narrow viewing angle mode, the light shielding angle on one side of the right side and the left side of the screen can be set to, for example, a polar angle of 40°, and it is possible to realize a sufficiently small light shielding angle on the one side. As a result, in the narrow viewing angle mode, it is possible to reduce a range (polar angle range) in which an image displayed on the liquid crystal display panel 20 can be visually recognized.

The display device 1 of the present embodiment includes a backlight 30, the liquid crystal panel 10, and the liquid crystal display panel 20 in order from the back side to the observation side.

The liquid crystal panel 10 includes the first polarizing plate 10P1, the first substrate 110, the first alignment film 120, the liquid crystal layer 130 (also referred to as the first liquid crystal layer 130), the second alignment film 140, the second substrate 150, and the second polarizing plate 10P2 in order from the observation side to the back side.

The liquid crystal display panel 20 includes a third polarizing plate 10P3, a third substrate 210, a third alignment film 220, a second liquid crystal layer 230, a fourth alignment film 240, a fourth substrate 250, and a third polarizing plate 10P3 in order from the observation side to the back side. The liquid crystal display panel 20 includes a plurality of pixels disposed in a matrix in the in-plane direction.

The third substrate 210 includes a third support substrate 211, a color filter layer 212, and a black matrix layer 213 in order from the observation side to the back side. The third substrate 210 is also referred to as a color filter substrate.

The third support substrate 211 is not particularly limited, and for example, the same substrates as the first support substrate 111 and the second support substrate 151 can be used.

The color filter layer 212 is configured of, for example, a red color filter, a green color filter, and a blue color filter. The red color filter, the green color filter, and the blue color filter are made of, for example, a transparent resin containing a pigment.

The black matrix layer 213 is disposed in a lattice pattern to partition the color filters of each color provided on the color filter layer 212. The material of the black matrix layer is not particularly limited as long as the material has a light shielding property, but a resin material containing a black pigment or a metal material having a light shielding property is preferably used. The black matrix layer 213 is formed by, for example, a photolithography method of applying a photosensitive resin containing a black pigment to form a film, exposing, developing, and the like.

The fourth substrate 250 preferably includes a third electrode 252 and a fourth electrode 254. With such an aspect, it is possible to realize an in-plane switching (IPS) mode or a fringe field switching (FFS) mode, and the liquid crystal display panel 20 alone can function as a wide viewing angle mode. In the present embodiment, a case where the liquid crystal display panel 20 is in an FFS mode will be described as an example.

As illustrated in FIG. 19, the fourth substrate 250 includes a fourth support substrate 251, a third electrode 252 disposed for each pixel, and an insulating layer 253, and the fourth electrode 254 having a linear electrode portion 254a in order from the back side to the observation side. That is, the fourth substrate 250 has an FFS type electrode structure having the third electrode 252 and the fourth electrode 254 laminated via the insulating layer 253. The fourth substrate 250 is also referred to as an active matrix substrate.

The fourth substrate 250 includes a plurality of gate lines extending in parallel with each other and a plurality of source lines extending in parallel with each other in a direction intersecting each gate line through an insulating film on the fourth substrate 250. The plurality of gate lines and the plurality of source lines are formed in a lattice pattern as a whole. A TFT is disposed as a switching element at an intersection of a gate line and a source line.

In the present embodiment, the liquid crystal display panel 20 having an FFS type electrode structure will be described as an example, but the present embodiment can also be applied to an IPS type electrode structure provided in the same electrode layer such that the third electrode 252 and the fourth electrode 254 are each comb-teeth electrodes, and the comb teeth of the third electrode 252, which is a comb-teeth electrode, and the fourth electrode 254, which is a comb-teeth electrode, fit into each other.

The fourth support substrate 251 included in the fourth substrate 250 is not particularly limited, and for example, the same substrate as the first support substrate 111 and the second support substrate 151 can be used.

The third electrode 252 and the fourth electrode 254 are disposed for each pixel. The third electrode 252 is preferably a flat electrode. In the present specification, the "flat electrode" refers to an electrode without a slit or an opening in a plan view. It is preferable that the third electrode 252 overlaps with the linear electrode portion 254a included in at least the fourth electrode 254 described later in a plan view.

The fourth electrode 254 is disposed by being electrically coupled across the plurality of pixels. The fourth electrode 254 includes the linear electrode portion 254a. Examples of the planar shape of the fourth electrode 254 include a structure in which both ends of a plurality of linear electrode portions 254a are closed. The fourth electrode 254 may be provided with an opening 254b surrounded by the electrode portions.

A plurality of fourth electrodes 254 disposed for each pixel may be electrically coupled to each other, a common constant voltage may be applied to a plurality of pixels, each of the plurality of third electrodes 252 disposed for each pixel may be electrically coupled to the corresponding source line via a semiconductor layer included in the TFT, and a different voltage may be applied to each pixel depending on an image signal. Each of the plurality of fourth electrodes 254 may be electrically coupled to the corresponding source line via a semiconductor layer included in the TFT, a different voltage may be applied to each pixel according to an image signal, the plurality of third electrodes 252 may be electrically coupled to each other, and a common constant voltage may be applied to the plurality of pixels.

As the third electrode 252 and the fourth electrode 254, the same electrodes as the first electrode 112 and the second electrode 152 can be used.

Examples of the insulating layer 253 include an inorganic insulating film, an organic insulating film, and the like. As the inorganic insulating film, for example, an inorganic film (dielectric constant ε=5 to 7) such as silicon nitride (SiNx) or silicon oxide (SiO$_2$), or a laminated film thereof can be used. As the organic insulating film, for example, an organic film such as an acrylic resin, a polyimide resin, a novolac resin, or a laminate thereof can be used.

The third alignment film 220 and the fourth alignment film 240 control the alignment azimuth of the liquid crystal molecules 231 in a state with no voltage applied and the tilt angle of the liquid crystal molecules 231 in a state with no voltage applied. The third alignment film 220 and the fourth alignment film 240 may be a horizontal alignment film or a vertical alignment film, but from the viewpoint of adjusting in-plane liquid crystal retardation and obtaining sufficient white luminance, it is preferable that the third alignment film 220 and the fourth alignment film 240 are horizontal alignment films.

The third alignment film 220 and the fourth alignment film 240 may be a rubbing alignment film or a photoalignment film. The third alignment film 220 and the fourth alignment film 240 contain, for example, alignment film polymers such as polymers with polyimide in the main chain, polymers with polyamic acid in the main chain, polymers with polysiloxane in the main chain, and the like. The third alignment film 220 and the fourth alignment film 240 can be formed, for example, by applying an alignment film material containing the alignment film polymers described above onto the third substrate 210 and the fourth substrate 250, and the above coating method is not particularly limited, and for example, flexograhpy printing, ink-jet coating, and the like can be used.

The second liquid crystal layer 230 contains the liquid crystal molecules 231, and the alignment state of the liquid crystal molecules 231 changes according to the voltage applied to the second liquid crystal layer 230 such that the amount of light transmitted is controlled. The liquid crystal molecule may have a positive value or a negative value in the anisotropy of dielectric constant (Δε) defined by Equation (L) above, but preferably has a positive value in the anisotropy of dielectric constant.

The third polarizing plate 10P3 and a fourth polarizing plate 10P4 are both absorption type polarizers. As the third polarizing plate 10P3 and the fourth polarizing plate 10P4, for example, it is possible to use a polarizer (absorption type polarizing plate) which is obtained by dyeing and adsorbing an anisotropic material such as an iodine complex (or dye) to a polyvinyl alcohol (PVA) film, and then stretching and aligning the film.

The third polarizing plate 10P3 has a third absorption axis 10P3A and a third transmission axis orthogonal to the third absorption axis 10P3A. The fourth polarizing plate 10P4 has a fourth absorption axis 10P4A and a fourth transmission axis orthogonal to the fourth absorption axis 10P4A.

It is preferable that the third absorption axis 10P3A is orthogonal to the fourth absorption axis 10P4A. That is, it is preferable that the third polarizing plate 10P3 and the fourth polarizing plate 10P4 are disposed in a crossed Nicol state.

It is preferable that the third absorption axis 10P3A is orthogonal to the first absorption axis 10P1A and the second absorption axis 10P2A. With such an aspect, black display can be realized in a state with no voltage applied.

As illustrated in FIG. 20, for example, the axial azimuth of the first absorption axis 10P1A, the second absorption axis 10P2A, and the fourth absorption axis 10P4A is set to 90°, and the axial azimuth of the third absorption axis 10P3A is set to 0°.

As illustrated in FIG. 19, the backlight 30 is disposed on the back side of the liquid crystal panel 10. The backlight 30 is not particularly limited as long as the backlight irradiates the liquid crystal panel 10 with light, and a direct type backlight, an edge type backlight, or any other method may be used. The backlight 30 of the present embodiment is an edge type backlight 30, and as illustrated in FIG. 19, includes a light source 31 and a light guide plate 32. The backlight 30 may further include an optical sheet such as a reflector, a diffuser plate, and a prism sheet as appropriate. The backlight 30 may include a louver film in order to improve the directivity.

The light source 31 is not particularly limited as long as the light source 31 emits light including visible light, and may emit light including only visible light or may emit light including both visible light and ultraviolet light. A light source that emits white light is preferably used to enable color display by the liquid crystal display panel 20. As the type of the light source 31, for example, a cold cathode fluorescent lamp (CCFL), a light emitting diode (LED), or the like is suitably used. In the present specification, the "visible light" means light (electromagnetic wave) having a wavelength of 380 nm or more and less than 800 nm.

The light guide plate 32 may have a function of making the light incident from the end surface into uniform surface emitting light, and the light guide plate commonly used in the field of liquid crystal display devices can be used.

It is preferable that the backlight 30 includes a light guide plate 32, and the light guide plate 32 functions for a wide viewing angle mode. With such an aspect, it is possible to realize a wide viewing angle mode by the light guide plate, and it is possible to realize a wide viewing angle mode and a narrow viewing angle mode by applying and not applying a voltage to the liquid crystal layer 130 included in the liquid crystal panel 10.

It is possible to realize the light guide plate for the wide viewing angle mode by, for example, a light guide plate having a function of spreading light. In a wide viewing angle mode, the surface emitting light is emitted by making the light incident on at least one light guide plate having a function of diffusing the light. Furthermore, the light shielding function of the light shielding panel (liquid crystal panel 10) can be turned off by applying no voltage. The liquid crystal display panel 20 can display an image at a wide viewing angle based on the surface emitting light obtained by combining the backlight 30 and the light shielding panel. At this time, a wide viewing angle mode may be set by making light incident on a light guide plate for a narrow viewing angle mode and causing two light guide plates for a narrow viewing angle mode and a wide viewing angle mode to emit light, or a wide viewing angle mode may be set with a single light guide plate for a wide viewing angle mode without any light entering a light guide plate for a narrow viewing angle mode.

On the other hand, in the narrow viewing angle mode, the light is not incident on the light guide plate having a function of diffusing the light, and the light is incident on the light guide plate designed for a narrow viewing angle mode. Further, by setting the light shielding panel in a state with a voltage applied, it is possible to obtain surface emitting light that is not emitted in directions other than a specific angular direction. By irradiating the display panel with the surface emitting light obtained by making light incident on a light guide plate in a narrow viewing angle mode, and the surface emitting light obtained by blocking light in a specific anglular direction by the light shielding panel, it is possible to display an image only in a narrow viewing angle.

The number of light guide plates included in the backlight 30 is not particularly limited, and two or more light guide plates may be provided. When the backlight 30 includes a plurality of light guide plates, at least one thereof may be for the narrow viewing angle mode. For example, the backlight 30 may include a light guide plate laminate in which at least one layer of a light guide plate having a function of diffusing light (also referred to as a light guide plate for diffusion), and at least one layer of a light guide plate having a function of suppressing light diffusion (also referred to as a light guide plate for non-diffusion) are stacked, and the backlight may be capable of switching between a public mode and a private mode by independently controlling the LEDs disposed at the ends of each light guide plate.

The liquid crystal display panel 20 may further include a viewing angle widening film (phase difference film) on the observation side of the third substrate 210 or the back side of the fourth substrate 250. Examples of the viewing angle widening film include a SAM film having a fine wedged slope structure and diffusing straight light in all directions.

Modification Example 1 of Embodiment 2

The display device 1 of Embodiment 2 described above includes one liquid crystal panel 10, but the display device 1 may include a plurality of liquid crystal panels 10. Also with such a configuration, the same effect as that of Embodiment 2 can be obtained.

Modification Example 2 of Embodiment 2

The liquid crystal display panel 20 included in the display device 1 of Embodiment 2 is disposed on the observation side of the liquid crystal panel 10, but the disposition of the liquid crystal display panel 20 is not limited thereto, and the liquid crystal display panel 20 may be disposed on the back side of the liquid crystal panel 10. Also with such a configuration, the same effect as that of Embodiment 2 can be obtained.

Modification Example 3 of Embodiment 2

In Embodiment 2, the liquid crystal display panel 20 is used as the display panel, but the display panel is not particularly limited as long as the display panel is a light emitting system, and examples of the display panel include an organic electro luminescence (EL) display panel, an inorganic EL display panel, a micro-LED display panel, or a quantum dot light emitting diode (QLED) display panel.

In a case where the display panel is an organic EL display panel, an inorganic EL display panel, a micro-LED display panel, or a QLED display panel, the liquid crystal panel 10 is disposed on the observation side of the display panel, and the display device 1 does not include a backlight. As the method of QLED, for example, a liquid crystal type is used, a blue LED is used as a backlight light source, and wavelength conversion by quantum dots (conversion from blue light to green light, conversion from blue light to red light, blue light is transmitted as is) is used such that richer color reproduction and lower power consumption can be realized as compared with the liquid crystal panel in the related art.

An absorption type may be used as the second polarizing plate 10P2, but for example, since organic light-emitting diode (OLED) light used in an organic EL display panel is non-polarized, it is possible to increase light recycling efficiency and improve luminance by using a reflective type (as a configuration, linear polarizing plate/reflective polarizing plate).

The effects of the present disclosure will be described below with reference to examples and comparative examples, but the present disclosure is not limited by these examples.

Example 1

Figure 21:
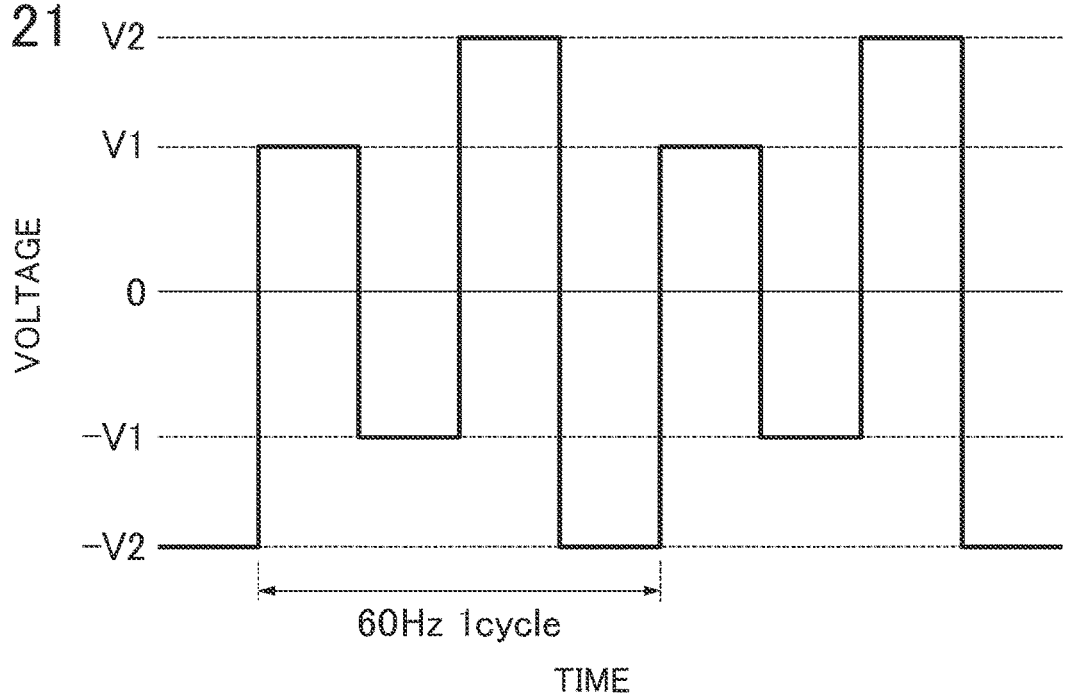
FIG. 21 is a graph illustrating a waveform of a voltage applied between a pair of electrodes included in a liquid crystal panel of Example 1.
Figure 22:
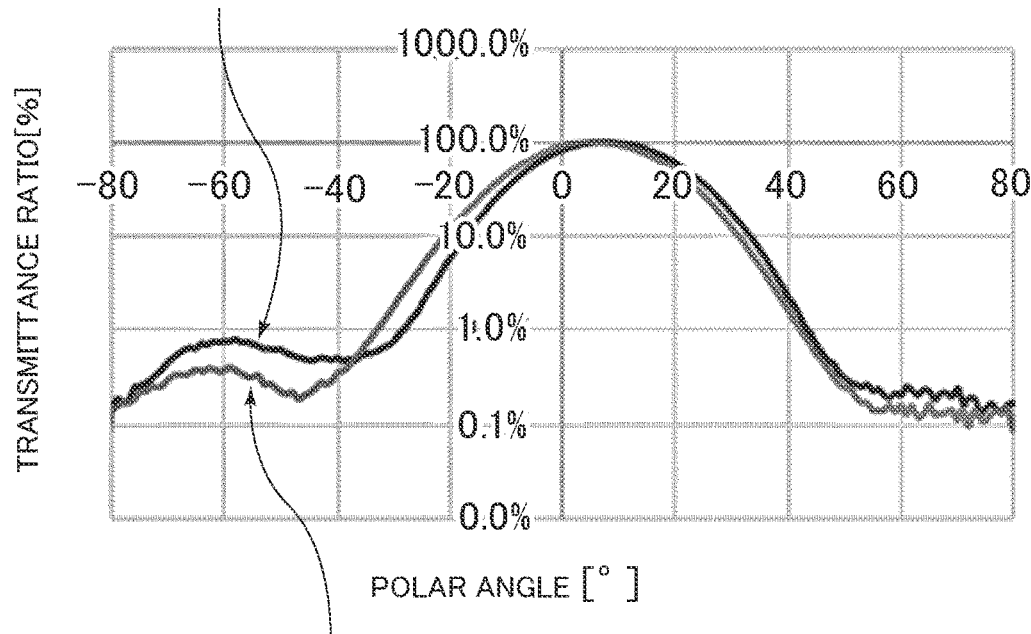
FIG. 22 is a simulation result illustrating a light shielding performance in a horizontal direction when the liquid crystal panel of Example 1 is viewed from the front of a screen, and a light shielding performance in a horizontal direction when looking down on the liquid crystal panel of Example 1 from an angle higher than 20° in a vertical direction from the front of a screen.

FIG. 21 is a graph illustrating a waveform of a voltage applied between a pair of electrodes included in a liquid crystal panel of Example 1. FIG. 22 is a simulation result illustrating a light shielding performance in a horizontal direction when a liquid crystal panel of Example 1 is viewed from the front of a screen, and a light shielding performance in a horizontal direction when looking down on the liquid crystal panel of Example 1 from an angle higher than 20° in a vertical direction from the front of a screen.

A light shielding performance was simulated for the liquid crystal panel of Example 1 having the same configuration as that of Embodiment 1. A voltage was applied between a pair of electrodes included in the liquid crystal panel of Example 1 as illustrated in FIG. 21. Specifically, in Example 1, the voltage V1, the voltage-V1, the voltage V2, and the voltage-V2 were repeatedly applied between the pair of electrodes in order. In Example 1, for example, the voltage V1 and the voltage −V1 correspond to the first voltage, and the voltage V2 and the voltage −V2 correspond to the second voltage. In Example 1, the first voltage and the second voltage having different absolute values were alternately applied between the pair of electrodes. The voltage V1 was 3.0 V, the voltage −V1 was −3.0 V, the voltage V2 was 3.2 V, and the voltage −V2 was −3.2 V.

Comparative Example 1

Figure 23:
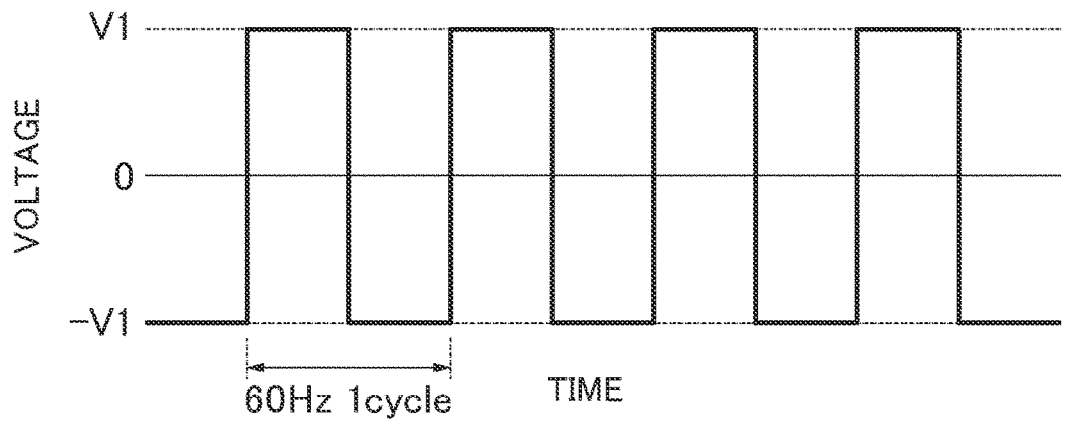
FIG. 23 is a graph illustrating a waveform of a voltage applied between a pair of electrodes included in a liquid crystal panel of Comparative Example 1.
Figure 24:
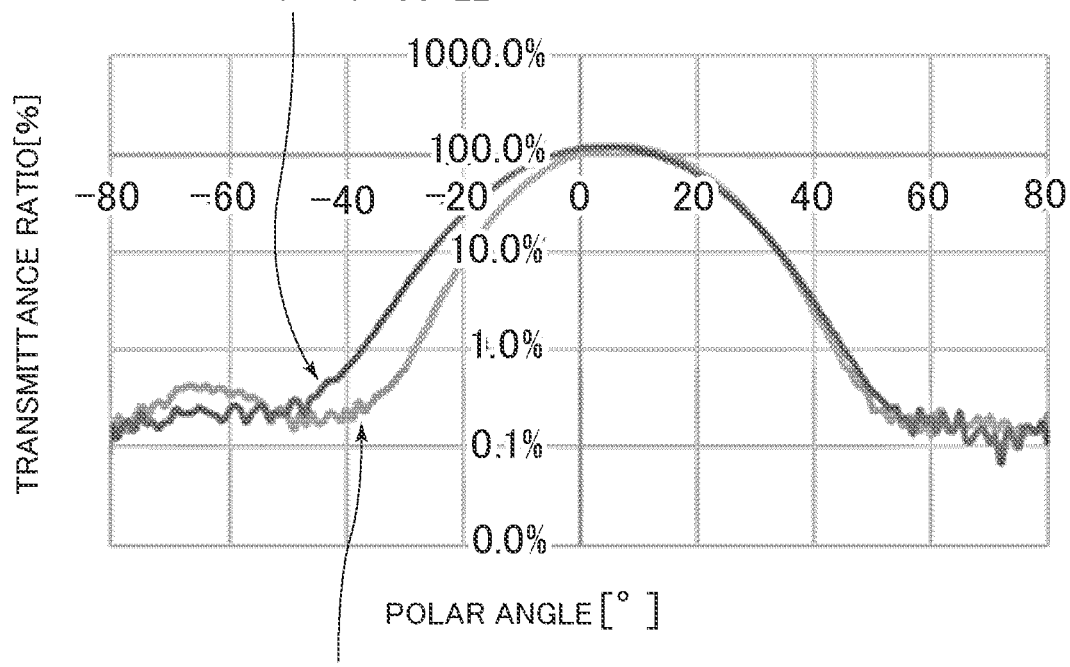
FIG. 24 is a simulation result illustrating a light shielding performance in a horizontal direction when the liquid crystal panel of Comparative Example 1 is viewed from the front of a screen, and a light shielding performance in a horizontal direction when looking down on the liquid crystal panel of Comparative Example 1 from an angle higher than 20° in a vertical direction from the front of a screen.

FIG. 23 is a graph illustrating a waveform of a voltage applied between a pair of electrodes included in a liquid crystal panel of Comparative Example 1. FIG. 24 is a simulation result illustrating a light shielding performance in a horizontal direction when the liquid crystal panel of Comparative Example 1 is viewed from the front of a screen, and a light shielding performance in a horizontal direction when looking down on the liquid crystal panel of Comparative Example 1 from an angle higher than 20° in the vertical direction from the front of a screen.

The light shielding performance was simulated for the liquid crystal panel of Comparative Example 1 having the same configuration as that of Example 1, except that the voltage illustrated in FIG. 23 was applied between the pair of electrodes. Specifically, in Comparative Example 1, the voltage V1 and the voltage −V1 were alternately applied between the pair of electrodes. That is, in Comparative Example 1, positive and negative voltages (voltage V1 and voltage −V1) having the same absolute value were alternately applied.

Comparison of Example 1 and Comparative Example 1

Based on FIGS. 22 and 24, the transmittance front luminance ratio at a predetermined polar angle was studied when viewed from the front of the screen and when looking down on the panel from an angle higher than 20° in the vertical direction from the front of the screen. The results are illustrated in Table 1 below.

TABLE 1

| | | | angle (horizontal) | | |
|---|---|---|---|---|---|
| | | | −40° (polar angle −40°) | −35° (polar angle 35°) | 0° (polar angle 0°) |
| Comparative Example 1 | angle (vetical) | 0° (front of screen) | 0.2% | 0.3% | 100% |
| | | 20° (looking down from angle higher 20° in vertical direction from front of screen) | 0.6% | 1.5% | 100% |
| Example 1 | | 0° (front of screen) | 0.5% | 0.6% | 100% |
| | | 20° (looking down from angle higher 20° in vertical direction from front of screen) | 0.3% | 0.7% | 100% |

As illustrated in Table 1, the light shielding performance (transmittance front luminance ratio) at a polar angle of −35 degrees when looking down on the liquid crystal panel from an angle above 20 degrees was 1.5% in Comparative Example 1, and 0.7% in Example 1. Therefore, it was found that the light shielding performance was improved in Example 1 as compared with Comparative Example 1. That is, in the liquid crystal panel of Example 1, it was found that it was possible to suppress the deterioration of the light shielding property in the horizontal direction when viewed from the upper side of the screen.

In the normal liquid crystal panel such as that in Comparative Example 1, a light shielding performance may be deteriorated by moving the line of sight up and down. However, by using the liquid crystal panel of Example 1, it is possible to realize a high light shielding performance even when moving the line of sight up and down.

In Example 1, as illustrated in FIG. 21, the driving frequency is set to 60 Hz, but may be set to 120 Hz, and the driving frequency can be freely selected. Further, the driving waveform of the panel is a rectangular wave, but other shapes may be used as long as a desired effect is obtained.

In the present example, since a study was performed assuming mounting on a left-hand drive vehicle, the light shielding performance was studied in a range in which the polar angle was in a negative direction. It is easy to reverse the light shielding performance from side to side, and it can also be easily adapted to a right-hand drive vehicle.

Example 2

Figure 25:
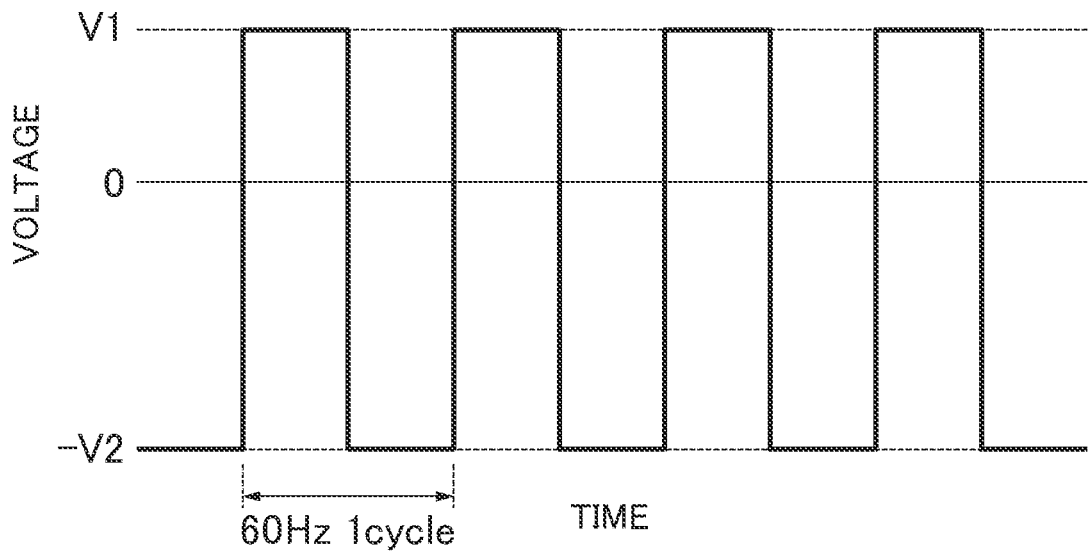
FIG. 25 is a graph illustrating a waveform of a voltage applied between a pair of electrodes included in a liquid crystal panel of Example 2.
Figure 26:
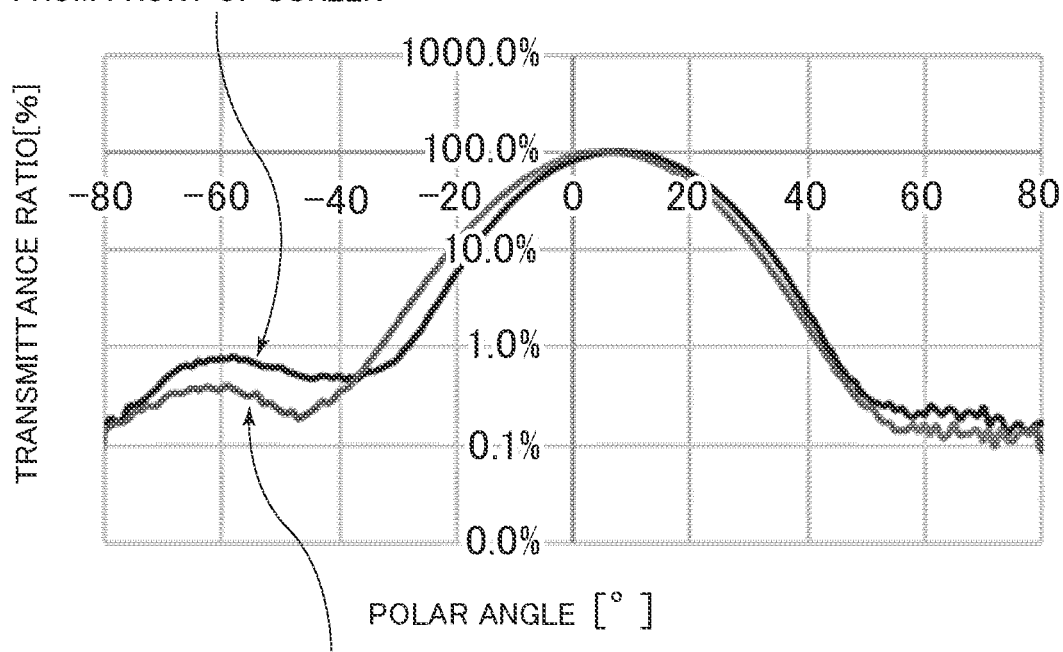
FIG. 26 is a simulation result illustrating a light shielding performance in a horizontal direction when a liquid crystal panel of Example 2 is viewed from the front of a screen, and a light shielding performance in a horizontal direction when looking down on the liquid crystal panel of Example 2 from an angle higher than 20° in a vertical direction from the front of a screen.

FIG. 25 is a graph illustrating a waveform of a voltage applied between a pair of electrodes included in a liquid crystal panel of Example 2. FIG. 26 is a simulation result illustrating a light shielding performance in a horizontal direction when a liquid crystal panel of Example 2 is viewed from the front of a screen, and a light shielding performance in a horizontal direction when looking down on the liquid crystal panel of Example 2 from an angle higher than 20° in a vertical direction from the front of a screen.

A light shielding performance was simulated for the liquid crystal panel of Example 2 having the same configuration as that of Modification Example 1 of Embodiment 1. A voltage was applied between a pair of electrodes included in the liquid crystal panel of Example 2 as illustrated in FIG. 25. Specifically, in Example 2, the voltage V1 and the voltage −V2 were repeatedly applied between the pair of electrodes in order. In Example 2, for example, the voltage V1 corresponds to the first voltage, and the voltage −V2 corresponds to the second voltage. In Example 2, the first voltage and the second voltage having different absolute values were alternately applied between the pair of electrodes. The voltage V1 was 3.0 V, and the voltage −V2 was −3.2 V.

Comparison of Example 2 and Comparative Example 1

Based on FIGS. 24 and 26, the transmittance at a predetermined polar angle was studied when viewed from the front of the screen and when looking down on the panel from an angle higher than 20° in the vertical direction from the front of the screen, respectively. As illustrated in FIGS. 24 and 26, in Example 2, it was found that the same effect as in Example 1 can be obtained without applying a complex signal by changing the value of the voltage depending on the positive and negative driving voltage.

Example 3

Figure 27:
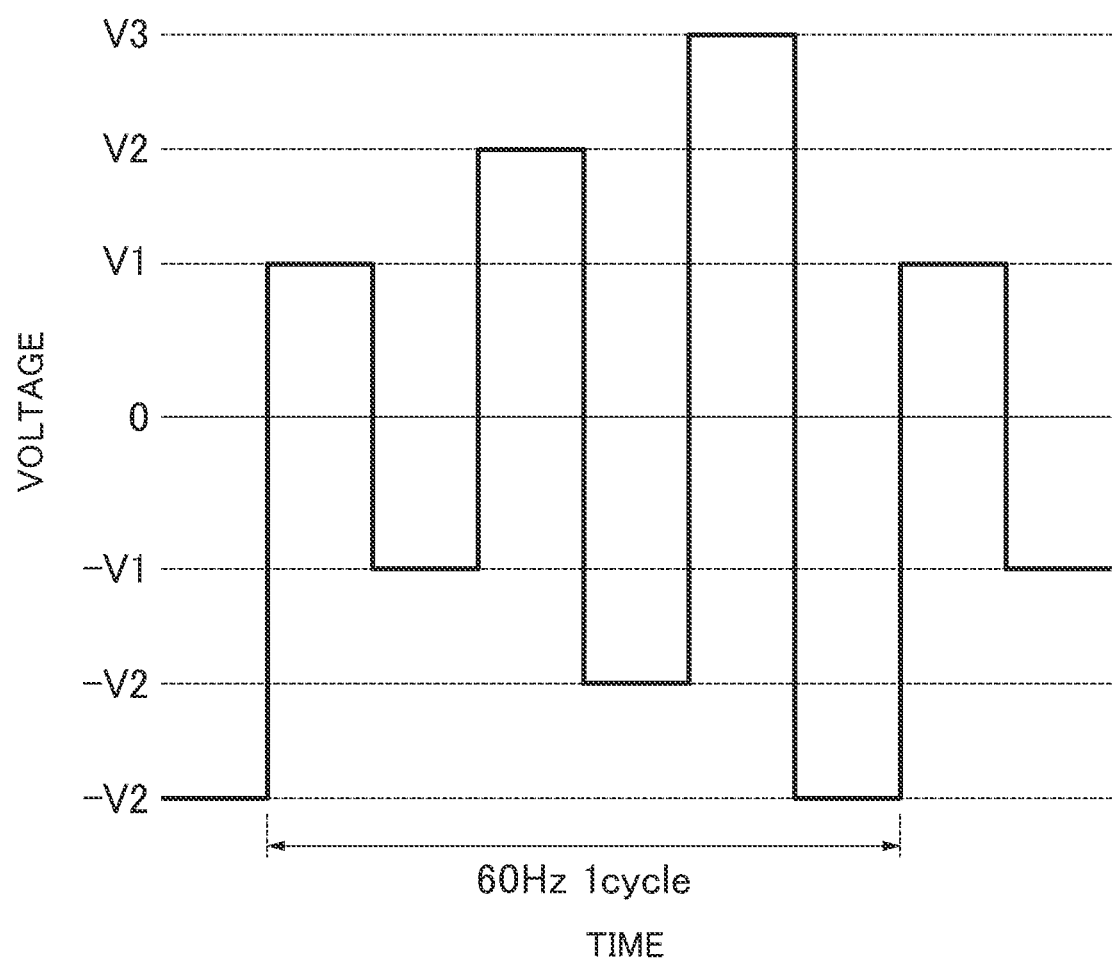
FIG. 27 is a graph illustrating a waveform of a voltage applied between a pair of electrodes included in a liquid crystal panel of Example 3.

FIG. 27 is a graph illustrating a waveform of a voltage applied between a pair of electrodes included in a liquid crystal panel of Example 3. A light shielding performance was simulated for the liquid crystal panel of Example 3 having the same configuration as that of Modification Example 2 of Embodiment 1.

As illustrated in FIG. 27, the first voltage, the second voltage, and the third voltage having different absolute values were repeatedly applied between a pair of electrodes included in the liquid crystal panel of Example 3 in order. Specifically, the voltage V1, the voltage −V1, the voltage V2, the voltage −V2, the voltage V3, and the voltage −V3 were repeatedly applied between the pair of electrodes in order. The voltage V1 was 3.0 V, the voltage −V1 was −3.0 V, the voltage V2 was 3.2 V, the voltage −V2 was −3.2 V, the voltage V3 was 3.4 V, and the voltage −V3 was −3.4 V. In Example 3, it was possible to further improve the light shielding performance when moving the line of sight up and down.

Example 4

Figure 28:
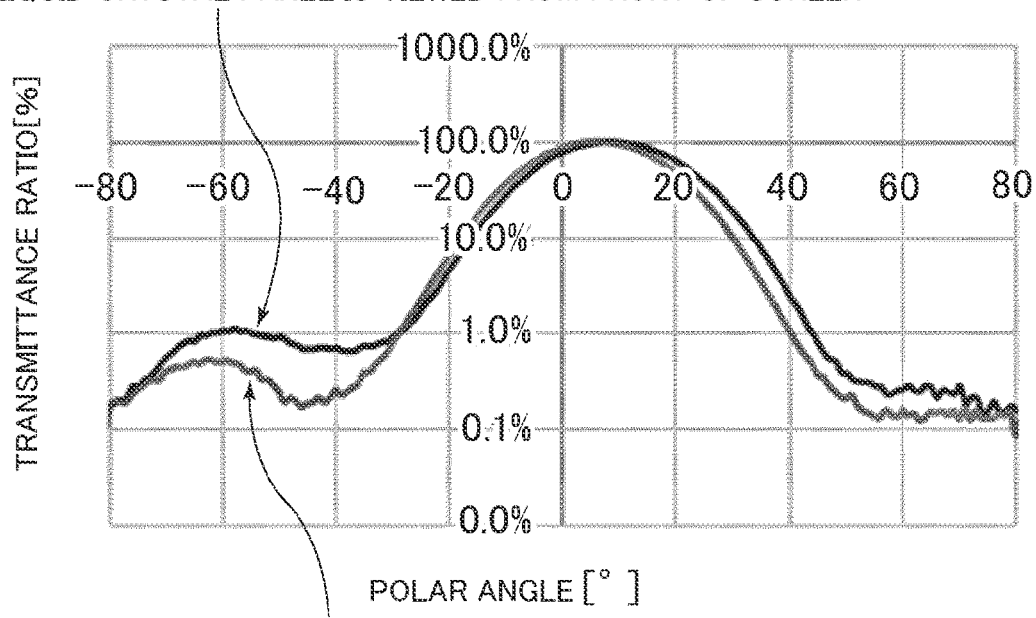
FIG. 28 is a simulation result illustrating a light shielding performance in a horizontal direction when a liquid crystal panel of Example 4 is viewed from the front of a screen, and a light shielding performance in a horizontal direction when looking down on the liquid crystal panel of Example 4 from an angle higher than 20° in a vertical direction from the front of a screen.
Figure 29:
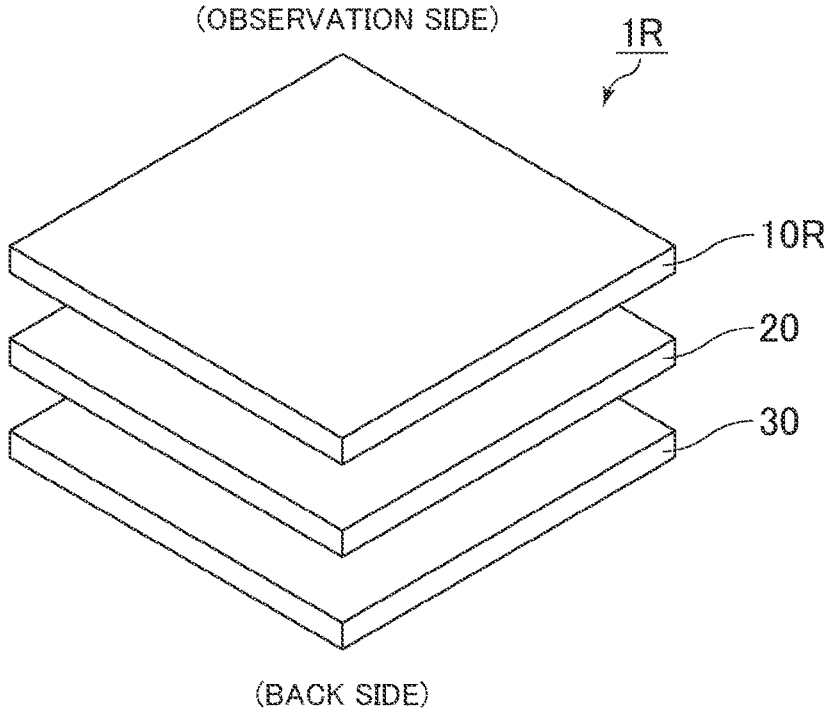
FIG. 29 is a schematic perspective view illustrating an example of a viewing angle control switching type display device capable of switching between a public mode and a private mode.
Figure 30:
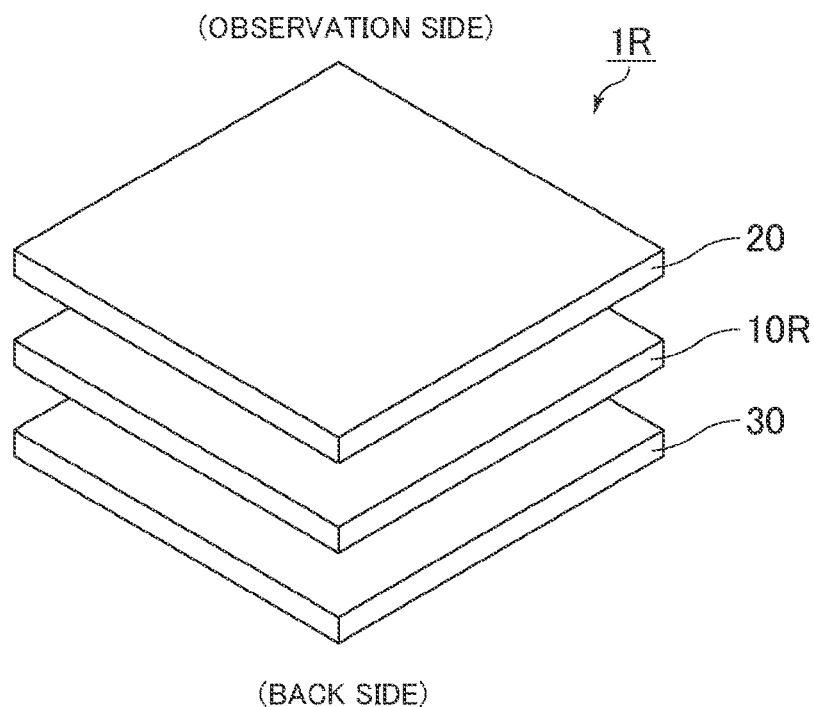
FIG. 30 is a schematic perspective view illustrating an example of the viewing angle control switching type display device capable of switching between the public mode and the private mode.
Figure 31:
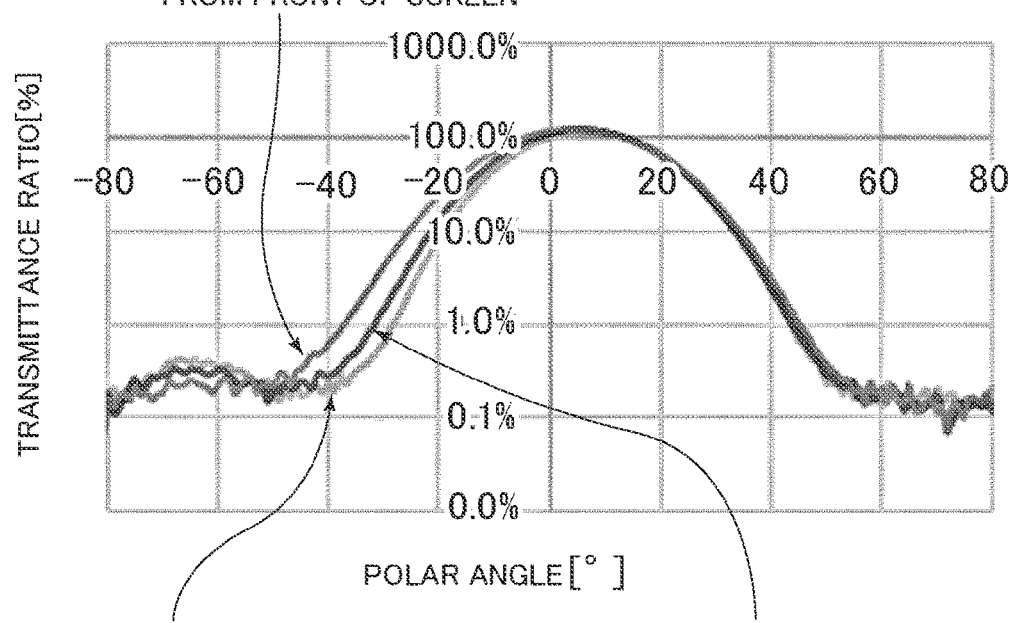
FIG. 31 is a graph illustrating a light shielding performance of the viewing angle control switching type display device illustrated in FIGS. 29 and 30.

FIG. 28 is a simulation result illustrating a light shielding performance in a horizontal direction when a liquid crystal panel of Example 4 is viewed from the front of a screen, and a light shielding performance in a horizontal direction when looking down on the liquid crystal panel of Example 4 from an angle higher than 20° in the vertical direction from the front of a screen.

A light shielding performance was simulated for a liquid crystal panel of Example 4 having the same configuration as that of Modification Example 3 of Embodiment 1. The simulation of Example 4 was performed in the same manner as in Example 1, except that the ratio of the time during which the first voltage was applied and the time during which the second voltage was applied was set to 6:1. That is, in Example 4, the time during which the first voltage was applied and the time during which the second voltage was applied were different from each other.

Comparison of Example 1 and Example 4

Based on FIGS. 22 and 28, the transmittance at a predetermined polar angle was studied when viewed from the front of the screen and when looking down the panel from an angle higher than 20° in the vertical direction from the front of the screen, respectively.

In Example 1, the ratio of the time during which the first voltage was applied and the time during which the second voltage was applied was set to 1:1. As illustrated in FIG. 22, in Example 1, there was a slight difference in the light shielding performance in the region of polar angles of −20° to −30° in the horizontal direction between when viewed from the front of the screen and when looking down on the panel from an angle higher than 20° in the vertical direction from the front of the screen. On the other hand, in Example 4, as illustrated in FIG. 28, the difference in the light shielding performance was suppressed.

The present disclosure contains subject matter related to that disclosed in Japanese Priority Patent Application JP 2023-009444 filed in the Japan Patent Office on Jan. 25, 2023, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal panel comprising:
   a first substrate;
   a second substrate that is disposed to face the first substrate;
   a liquid crystal layer that is located between the first substrate and the second substrate and contains liquid crystal molecules;
   a pair of electrodes that apply a voltage to the liquid crystal layer; and
   a voltage control unit that performs control to alternately apply a first voltage having a first absolute value and a second voltage having a second absolute value different from the first absolute value between the pair of electrodes, wherein
   the first voltage includes a voltage $V1$ that has the first absolute value and is a positive value, and a voltage $-V1$ that has the first absolute value and is a negative value,
   the second voltage includes a voltage $V2$ that has the second absolute value and is a positive value, and a voltage $-V2$ that has the second absolute value and is a negative value,
   the voltage control unit repeatedly applies one cycle of the voltage $V1$, the voltage $-V1$, the voltage $V2$, and the voltage $-V2$ in this order between the pair of electrodes, and
   the voltage $V1$ is smaller than the voltage $V2$, and neither of the voltage $V1$ and the voltage $V2$ is zero.

2. A liquid crystal panel comprising:
   a first substrate;
   a second substrate that is disposed to face the first substrate;
   a liquid crystal layer that is located between the first substrate and the second substrate and contains liquid crystal molecules;
   a pair of electrodes that apply a voltage to the liquid crystal layer; and
   a voltage control unit that performs control to alternately apply a first voltage having a first absolute value and a second voltage having a second absolute value different from the first absolute value between the pair of electrodes, wherein:
   the voltage control unit further performs control to repeatedly apply the first voltage, the second voltage, and a third voltage having a third absolute value different from the first absolute value and the second absolute value between the pair of electrodes in this order,
   the first voltage includes a voltage $V1$ that has the first absolute value and is a positive value, and a voltage $-V1$ that has the first absolute value and is a negative value, the second voltage includes a voltage $V2$ that has the second absolute value and is a positive value, and a voltage $-V2$ that has the second absolute value and is a negative value,
   the third voltage includes a voltage $V3$ that has the third absolute value and is a positive value, and a voltage $-V3$ that has the third absolute value and is a negative value, the voltage control unit repeatedly applies one cycle of the voltage $V1$, the voltage $-V1$, the voltage $V2$, the voltage $-V2$, the voltage $V3$, and the voltage $-V3$ in this order between the pair of electrodes, and
   the voltage $V1$ is smaller than the voltage $V2$, the voltage $V2$ is smaller than the voltage $V3$, and none of the voltage $V1$, the voltage $V2$, and the voltage $V3$ is zero.

3. The liquid crystal panel according to claim 1, wherein the voltage control unit makes a time during which the first voltage is applied and a time during which the second voltage is applied different from each other.

4. The liquid crystal panel according to claim 1, further comprising:
   a line of sight detection sensor that senses a line of sight of an observer.

5. The liquid crystal panel according to claim 1, further comprising:
   a first polarizing plate that is disposed on an observation side of the first substrate and has a first absorption axis, wherein
   when viewed in a plan view, an angle a, formed between a direction in which molecular long axes are averagely aligned in nematic liquid crystal molecules as the liquid crystal molecules that are in a state in which no voltage is applied, and the first absorption axis, is 5° or more and 20° or less, or 65° or more and 80° or less.

6. The liquid crystal panel according to claim 5, further comprising:
   a second polarizing plate that has a second absorption axis parallel to the first absorption axis on a side of the second substrate opposite the liquid crystal layer.

7. The liquid crystal panel according to claim 1, wherein a tilt angle of the liquid crystal molecules is 1° or more and 5° or less in a state with no voltage applied, and a tilt angle of the liquid crystal molecules is 40° or more and 75° or less in a state with a voltage applied.

8. The liquid crystal panel according to claim 1, wherein the liquid crystal panel is in an electrically controlled birefringence (ECB) mode.

9. The liquid crystal panel according to claim 1, wherein a retardation Re of the liquid crystal layer in a state with a voltage applied is 600 nm or more and 1000 nm or less.

10. The liquid crystal panel according to claim 1, wherein a thickness d of the liquid crystal layer is 3 μm or more and 10 μm or less.

11. The liquid crystal panel according to claim 1, wherein the liquid crystal molecules have a positive anisotropy of dielectric constant.

12. The liquid crystal panel according to claim 1, further comprising:
a negative C plate that has a retardation Rth of 500 nm or more in a thickness direction.

13. A display device comprising:
the liquid crystal panel according to claim 1; and
a display panel.

14. The display device according to claim 13, wherein
the display panel is a liquid crystal display panel in an in-plane switching (IPS) mode or a fringe field switching (FFS) mode.

15. The display device according to claim 13, further comprising:
a backlight, wherein
the backlight includes a light guide plate, and
the light guide plate functions for a wide viewing angle mode.

16. The display device according to claim 13, wherein
the display panel is one of an organic electro luminescence (EL) display panel, an inorganic EL display panel, a micro light emitting diode (micro-LED) display panel, or a quantum dot light emitting diode (QLED) display panel.

* * * * *